United States Patent
Kang et al.

(10) Patent No.: US 9,848,072 B2
(45) Date of Patent: Dec. 19, 2017

(54) ELECTRONIC DEVICE MONITORING METHOD AND APPARATUS

(71) Applicant: Samsung Electronics Co., Ltd, Gyeonggi-do (KR)

(72) Inventors: Yunjeong Kang, Gyeonggi-do (KR); Daehwan Kim, Gyeonggi-do (KR); Hwiwoong Kim, Gyeonggi-do (KR); Goun Lee, Seoul (KR)

(73) Assignee: SAMSUNG ELECTRONICS CO., LTD., Suwon-si, Gyeonggi-Do (KR)

( * ) Notice: Subject to any disclaimer, the term of this patent is extended or adjusted under 35 U.S.C. 154(b) by 0 days.

(21) Appl. No.: 15/289,073

(22) Filed: Oct. 7, 2016

(65) Prior Publication Data

US 2017/0104861 A1 Apr. 13, 2017

(30) Foreign Application Priority Data

Oct. 8, 2015 (KR) .................. 10-2015-0141774

(51) Int. Cl.
*H04W 12/06* (2009.01)
*H04M 1/02* (2006.01)
(Continued)

(52) U.S. Cl.
CPC ............ *H04M 1/673* (2013.01); *G06F 21/31* (2013.01); *G06K 9/00288* (2013.01); *G06K 9/00771* (2013.01); *H04M 1/0264* (2013.01); *H04W 12/06* (2013.01); *H04M 1/67* (2013.01); *H04M 2203/6045* (2013.01); *H04M 2203/6054* (2013.01); *H04M 2250/52* (2013.01)

(58) Field of Classification Search
CPC ..... G06F 21/31; G06F 21/32; G06K 9/00771; G06K 9/00288; G06K 9/00228; G06K 9/00268; G06K 9/00; H04M 1/0264; H04M 1/673; H04M 2250/52; H04M 2203/6054; H04M 1/67; H04M 2203/6045; H04W 12/06
See application file for complete search history.

(56) References Cited

U.S. PATENT DOCUMENTS 8,885,064 B1 * 11/2014 Cho .................. H04N 5/232
348/231.2
9,380,463 B2 * 6/2016 Lee .................. H04W 12/08
(Continued)

FOREIGN PATENT DOCUMENTS

| JP | 2005-123817 | 5/2005 |
| KR | 10-2001-0001221 | 1/2001 |
| KR | 10-2013-0014954 | 2/2013 |

*Primary Examiner* — Khawar Iqbal

(57) ABSTRACT

A method and apparatus for checking use of an electronic device based on a video signal obtained by a camera in the state that the device displays an authentication screen. The electronic device of the present disclosure includes a memory that stores user authentication information, a camera module, an input interface, and a processor. The processor receives a request for displaying a lock screen, activates the camera module based on the request, acquires images including at least one object in association with the electronic device, receives an input made through the input interface, compares the input with the authentication information, and transmits, when the input mismatches the authentication information, the acquired images to an external electronic device.

19 Claims, 17 Drawing Sheets

(51) Int. Cl.
    *G06F 21/32*     (2013.01)
    *H04M 1/673*     (2006.01)
    *G06F 21/31*     (2013.01)
    *G06K 9/00*     (2006.01)
    *H04M 1/67*     (2006.01)

(56) References Cited

U.S. PATENT DOCUMENTS

| | | | | |
|---|---|---|---|---|
| 9,547,364 | B2* | 1/2017 | S V | G06F 1/3203 |
| 2013/0247175 | A1* | 9/2013 | Nechyba | G06F 21/32 |
| | | | | 726/19 |
| 2014/0129646 | A1* | 5/2014 | Lee | G06F 21/60 |
| | | | | 709/206 |
| 2014/0162598 | A1* | 6/2014 | Villa-Real | H04M 1/66 |
| | | | | 455/411 |
| 2015/0220712 | A1* | 8/2015 | King | G06F 21/31 |
| | | | | 726/19 |
| 2016/0055323 | A1* | 2/2016 | Stuntebeck | G01P 13/00 |
| | | | | 726/17 |
| 2016/0072799 | A1* | 3/2016 | Hu | G06F 21/32 |
| | | | | 455/411 |
| 2016/0073002 | A1* | 3/2016 | Du | G06F 3/0488 |
| | | | | 382/100 |
| 2016/0301843 | A1* | 10/2016 | Shultz | H04M 1/72522 |
| 2016/0379042 | A1* | 12/2016 | Bourlai | G06K 9/00288 |
| | | | | 382/118 |
| 2017/0053109 | A1* | 2/2017 | Han | G06F 21/32 |

\* cited by examiner

ELECTRONIC DEVICE MONITORING METHOD AND APPARATUS

CROSS-REFERENCE TO RELATED APPLICATION(S) AND CLAIM OF PRIORITY

The present application is related to and claims the benefit under 35 U.S.C. §119(a) of a Korean patent application filed on Oct. 8, 2015, in the Korean Intellectual Property Office and assigned Serial No. 10-2015-0141774, the entire disclosure of which is hereby incorporated by reference.

TECHNICAL FIELD

The present disclosure relates to an electronic device monitoring method and apparatus and, in particular, to a method and apparatus for checking use of the electronic device based on the video signal captured by a camera in the state that the electronic device displays an authentication screen.

BACKGROUND

With the popularization of portable electronic devices (such as smartphones, laptop computers, and tablets), various types of portable electronic devices are used everywhere.

SUMMARY

As an electronic device is used in various environments, it risks the problems of access by unauthorized third-party users to the information stored therein and of the electronic device being stolen or lost.

To address the above-discussed deficiencies, it is a primary object to provide a method and apparatus for monitoring the electronic device for an access attempt by unauthorized users.

In accordance with an aspect of the present disclosure, an electronic device is provided. The electronic device includes a memory that stores user authentication information, a camera module, an input interface, and a processor; the processor receives a request for displaying a lock screen, activates the camera module based on the request, acquires images including at least one object in association with the electronic device, receives an input made through the input interface, compares the input with the authentication information, and transmits, when the input mismatches the authentication information, the acquired images to an external electronic device.

In accordance with another aspect of the present disclosure, a monitoring method of an electronic device is provided. The monitoring method includes receiving a request for displaying a lock screen, activating a camera module that is functionally connected to the electronic device based on the request, acquiring images including at least one object in association with the electronic device by means of the camera module, receiving an input made through an input interface that is functionally connected to the electronic device, comparing the input with authentication information, and transmitting, when the input mismatches the authentication information, the acquired images to an external electronic device.

In accordance with still another aspect of the present disclosure, a storage medium for storing commands executable by at least one processor to perform at least one operation is provided. The at least one operation includes receiving, at an electronic device, a request for displaying a lock screen, activating a camera module that is functionally connected to the electronic device based on the request, acquiring images including at least one object in association with the electronic device by means of the camera module, receiving an input made through an input interface that is functionally connected to the electronic device, comparing the input with authentication information, and transmitting, when the input mismatches the authentication information, the acquired images to an external electronic device.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
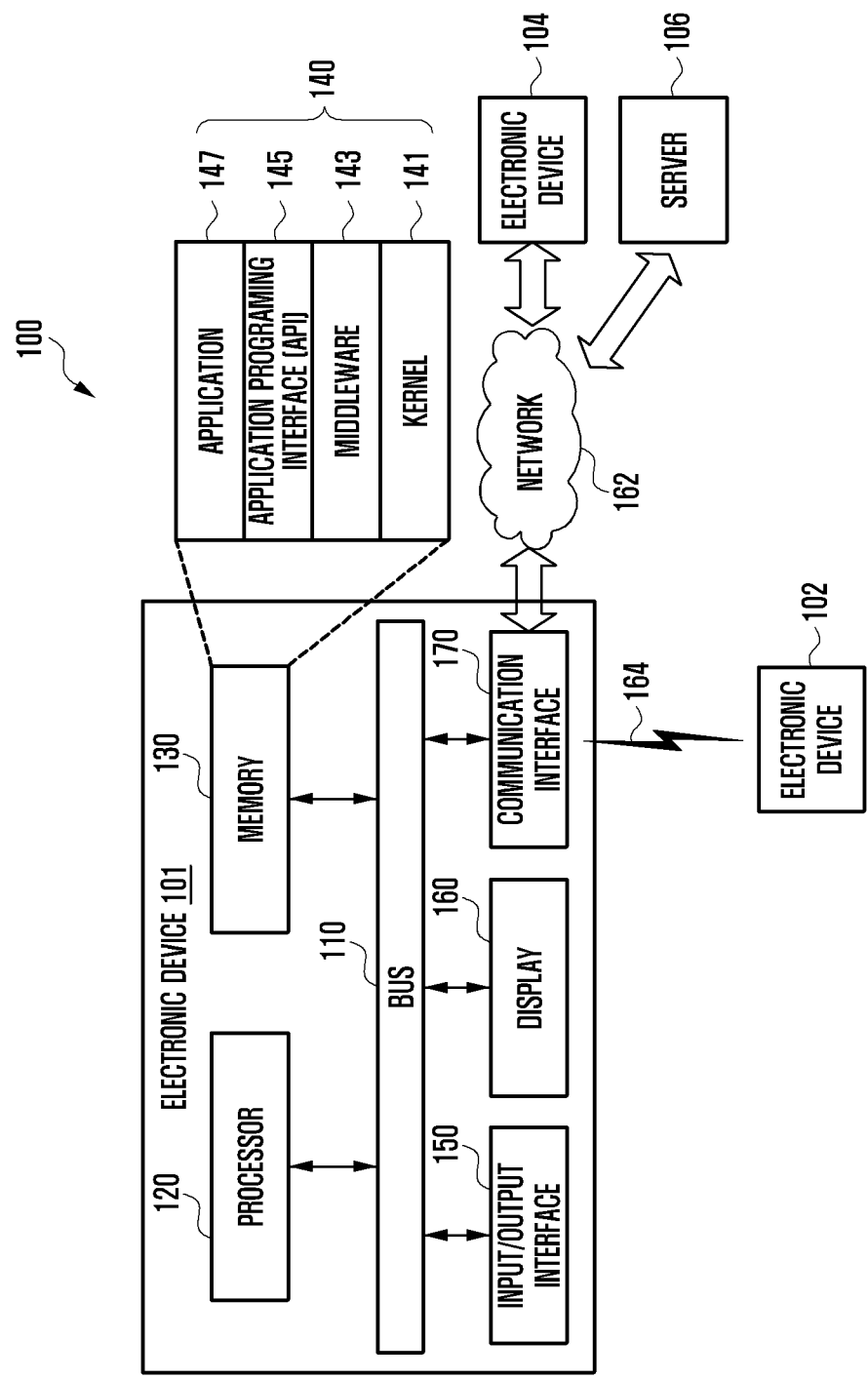
FIG. 1 is a block diagram illustrating electronic devices in a network environment according to various embodiments of the present disclosure.

FIGS. 1 through 17, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic device.

Hereinafter, the present disclosure will be described with reference to the accompanying drawings. Although specific embodiments are illustrated in the drawings and related detailed descriptions are discussed in the present specification, the present disclosure may have various modifications and several embodiments. However, various embodiments of the present disclosure are not limited to a specific implementation form and it should be understood that the present disclosure includes all changes and/or equivalents and substitutes included in the spirit and scope of various embodiments of the present disclosure. In connection with descriptions of the drawings, similar components are designated by the same reference numeral.

The term "include" or "may include" which may be used in describing various embodiments of the present disclosure refers to the existence of a corresponding disclosed function, operation or component which can be used in various embodiments of the present disclosure and does not limit one or more additional functions, operations, or components. In various embodiments of the present disclosure, the terms such as "include" or "have" may be construed to denote a certain characteristic, number, step, operation, constituent element, component or a combination thereof, but may not be construed to exclude the existence of or a possibility of addition of one or more other characteristics, numbers, steps, operations, constituent elements, components or combinations thereof.

In various embodiments of the present disclosure, the expression "or" or "at least one of A or/and B" includes any or all of combinations of words listed together. For example, the expression "A or B" or "at least A or/and B" may include A, may include B, or may include both A and B.

The expression "1", "2", "first", or "second" used in various embodiments of the present disclosure may modify various components of the various embodiments but does not limit the corresponding components. For example, the above expressions do not limit the sequence and/or importance of the components. The expressions may be used for distinguishing one component from other components. For example, a first user device and a second user device indicate different user devices although both of them are user devices. For example, without departing from the scope of the present disclosure, a first structural element may be referred to as a second structural element. Similarly, the second structural element also may be referred to as the first structural element.

When it is stated that a component is "coupled to" or "connected to" another component, the component may be directly coupled or connected to another component or a new component may exist between the component and another component. In contrast, when it is stated that a component is "directly coupled to" or "directly connected to" another component, a new component does not exist between the component and another component.

The terms used in describing various embodiments of the present disclosure are only examples for describing a specific embodiment but do not limit the various embodiments of the present disclosure. Singular forms are intended to include plural forms unless the context clearly indicates otherwise.

Unless defined differently, all terms used herein, which include technical terminologies or scientific terminologies, have the same meaning as that understood by a person skilled in the art to which the present disclosure belongs. Such terms as those defined in a generally used dictionary are to be interpreted to have the meanings equal to the contextual meanings in the relevant field of art, and are not to be interpreted to have ideal or excessively formal meanings unless clearly defined in the present description.

An electronic device according to various embodiments of the present disclosure may be a device including a communication function. For example, the electronic device may be one or a combination of a smart phone, a tablet Personal Computer (PC), a mobile phone, a video phone, an e-book reader, a desktop PC, a laptop PC, a netbook computer, a Personal Digital Assistant (PDA), a camera, a wearable device (for example, a Head-Mounted-Device (HMD) such as electronic glasses, electronic clothes, and electronic bracelet, an electronic necklace, an electronic appcessary, an electronic tattoo, and a smart watch.

According to some embodiments, the electronic device may be a smart home appliance having a communication function. The smart home appliance may include at least one of a TeleVision (TV), a Digital Video Disk (DVD) player, an audio player, an air conditioner, a cleaner, an oven, a microwave oven, a washing machine, an air cleaner, a set-top box, a TV box (for example, Samsung HomeSync™, Apple TV™, or Google TV™), game consoles, an electronic dictionary, an electronic key, a camcorder, and an electronic frame.

According to some embodiments, the electronic device may include at least one of various types of medical devices (for example, Magnetic Resonance Angiography (MRA), Magnetic Resonance Imaging (MRI), Computed Tomography (CT), a scanner, an ultrasonic device and the like), a navigation device, a Global Positioning System (GPS) receiver, an Event Data Recorder (EDR), a Flight Data Recorder (FDR), a vehicle infotainment device, electronic equipment for a ship (for example, a navigation device for ship, a gyro compass and the like), avionics, a security device, a head unit for a vehicle, an industrial or home robot, an Automatic Teller Machine (ATM) of financial institutions, and a Point Of Sale (POS) device of shops.

According to some embodiments, the electronic device may include at least one of furniture or a part of a building/structure, an electronic board, an electronic signature receiving device, a projector, and various types of measuring devices (for example, a water meter, an electricity meter, a gas meter, a radio wave meter and the like) including a camera function. The electronic device according to various embodiments of the present disclosure may be one or a combination of the above described various devices. Further, the electronic device according to various embodiments of the present disclosure may be a flexible device. It is apparent to those skilled in the art that the electronic device according to various embodiments of the present disclosure is not limited to the above described devices.

Hereinafter, an electronic device according to various embodiments of the present disclosure will be described with reference to the accompanying drawings. The term "user" used in various embodiments may refer to a person who uses an electronic device or a device (for example, an artificial intelligence electronic device) which uses an electronic device.

According to one embodiment of the present disclosure, a screen of an electronic device may be split into at least two windows according to a predefined split manner and displayed through a display of an electronic device. The windows are defined as split windows. According to one embodiment, the split windows are defined as windows displayed on a display of an electronic display not to be superposed one on another.

According to one embodiment, a popup window is defined as a window displayed on a display of an electronic device to hide or to be superposed on a portion of a screen under execution.

According to one embodiment of the present disclosure, an electronic device using split window and a popup window is capable of displaying two or more application execution screens or function execution screens. Thus, the split windows and the popup window are defined as a multi-window.

Hereinafter, an electronic device according to various embodiments will be described with reference to the accompanying drawings. As used herein, the term "user" may indicate a person who uses an electronic device or a device (e.g., an artificial intelligence electronic device) that uses an electronic device.

FIG. 1 illustrates a network environment 10 including an electronic device 101 according to various embodiments of the present disclosure. Referring to FIG. 1, the electronic device 100 includes a bus 110, a processor 120, a memory 130, a input/output interface 150, a display 160 and a communication interface 170.

The bus 110 may be a circuit connecting the above described components and transmitting communication (for example, a control message) between the above described components. The processor 120 receives commands from other components (for example, the memory 130, the input/output interface 150, the display 160, the communication interface 170) through the bus 110, analyzes the received commands, and executes calculation or data processing according to the analyzed commands. The memory 130 stores commands or data received from the processor 120 or other components (for example, the input/output interface 150, the display 160, or the communication interface 170) or generated by the processor 120 or other components. The memory 130 may include programming modules 140, for example, a kernel 141, middleware 143, an Application Programming Interface (API) 145, and an application 147. Each of the aforementioned programming modules may be implemented by software, firmware, hardware, or a combination of two or more thereof.

The kernel 141 controls or manages system resources (for example, the bus 110, the processor 120, or the memory 130) used for executing an operation or function implemented by the remaining other programming modules, for example, the middleware 143, the API 145, or the application 147. Further, the kernel 141 provides an interface for accessing individual components of the electronic device 101 from the middleware 143, the API 145, or the application 147 to control or manage the components. The middleware 143 performs a relay function of allowing the API 145 or the application 147 to communicate with the kernel 141 to exchange data. Further, in operation requests received from the application 147, the middleware 143 performs a control for the operation requests (for example, scheduling or load balancing) by using a method of assigning a priority, by which system resources (for example, the bus 110, the processor 120, the memory 130 and the like) of the electronic device 100 can be used, to the application 134.

The API 145 is an interface by which the application 147 can control a function provided by the kernel 141 or the middleware 143 and includes, for example, at least one interface or function (for example, command) for a file control, a window control, image processing, or a character control. The input/output interface 150 can receive, for example, a command and/or data from a user, and transfer the received command and/or data to the processor 120 and/or the memory 130 through the bus 110. The display 160 can display an image, a video, and/or data to a user.

According to an embodiment, the display 160 may display a graphic user interface image for interaction between the user and the electronic device 100. According to various embodiments, the graphic user interface image may include interface information to activate a function for correcting color of the image to be projected onto the screen. The interface information may be in the form of, for example, a button, a menu, or an icon. The communication interface 170 connects communication between the electronic device 100 and the external device (for example, electronic device 102, 104 or server 106). For example, the communication interface 160 may access a network 162 through wireless or wired communication to communicate with the external device. The wireless communication includes at least one of, for example, WiFi, BlueTooth® (BT), Near Field Communication (NFC), a Global Positioning System (GPS), and cellular communication (for example, LTE, LTE-A, CDMA, WCDMA, UMTS, WiBro or GSM). The wired communication may include at least one of, for example, a Universal Serial Bus (USB), a High Definition Multimedia Interface (HDMI), Recommended Standard 232 (RS-232), and a Plain Old Telephone Service (POTS).

According to an embodiment, the server 106 supports driving of the electronic device 100 by performing at least one operation (or function) implemented by the electronic device 100. For example, the server 106 may include a communication control server module that supports the communication interface 170 implemented in the electronic device 100. For example, the communication control server module may include at least one of the components of the communication interface 170 to perform (on behalf of) at least one operations performed by the communication interface 170.

Figure 2:
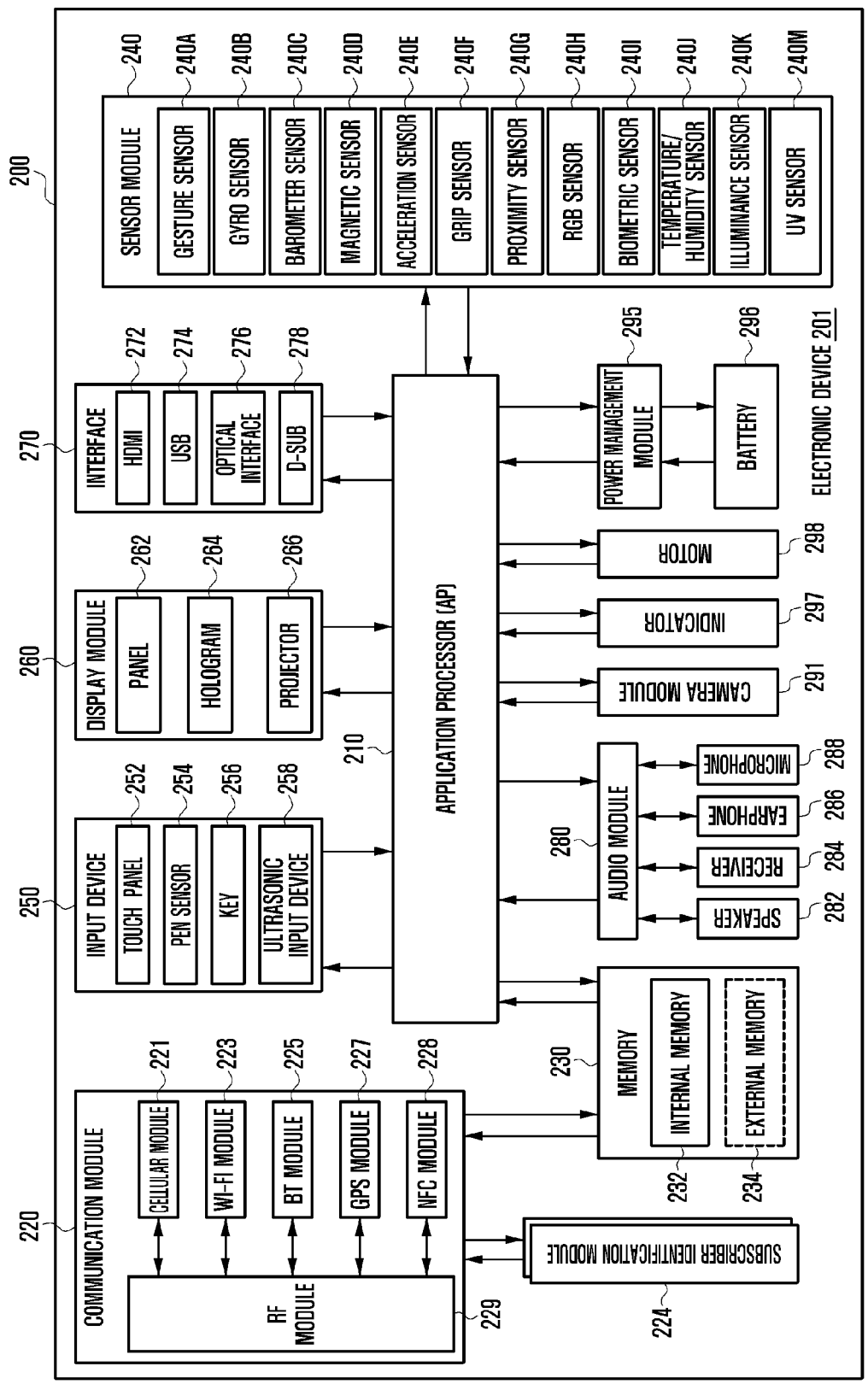
FIG. 2 is a block diagram illustrating a configuration of the electronic device according to various embodiments of the present disclosure.

FIG. 2 is a block diagram 200 of an electronic device 200 according to various embodiments of the present disclosure. The electronic device 200 may configure, for example, a whole or a part of the electronic device 100 illustrated in FIG. 1. Referring to FIG. 2, the electronic device 200 includes one or more Application Processors (APs) 210, a communication interface 220, a Subscriber Identification Module (SIM) card 224, a memory 230, a sensor module 240, an input device 250, a display 260, an interface 270, an audio module 280, a camera module 291, a power managing module 295, a battery 296, an indicator 297, and a motor 298.

The AP 210 operates an operating system (OS) or an application program so as to control a plurality of hardware or software component elements connected to the AP 210 and execute various data processing and calculations including multimedia data. The AP 210 may be implemented by, for example, a System on Chip (SoC). According to an embodiment, the processor 210 may further include a Graphic Processing Unit (GPU).

The communication interface 220 (for example, communication interface 170) transmits/receives data in communication between different electronic devices (for example, the electronic device 104 and the server 106) connected to the electronic device 200 (for example, electronic device 100) through a network. According to an embodiment, the communication interface 220 includes a cellular module 221, a WiFi module 223, a BlueTooth® (BT) module 225, a Global Positioning System (GPS) module 227, a Near Field Communication (NFC) module 228, and a Radio Frequency (RF) module 229.

The cellular module 221 provides a voice, a call, a video call, a Short Message Service (SMS), or an Internet service through a communication network (for example, Long Term Evolution (LTE), LTE-A, Code Division Multiple Access (CDMA), Wideband CDMA (WCDMA), UMTS, WiBro, GSM or the like). Further, the cellular module 221 may distinguish and authenticate electronic devices within a communication network by using a subscriber identification module (for example, the SIM card 224). According to an embodiment, the cellular module 221 performs at least some of the functions which can be provided by the AP 210. For example, the cellular module 221 may perform at least some of the multimedia control functions.

According to an embodiment, the cellular module 221 may include a Communication Processor (CP). Further, the cellular module 221 may be implemented by, for example, an SoC.

According to an embodiment, the AP 210 or the cellular module 221 (for example, communication processor) may load a command or data received from at least one of a non-volatile memory and other components connected to each of the AP 210 and the cellular module 221 to a volatile memory and process the loaded command or data. Further, the AP 210 or the cellular module 221 may store data received from at least one of other components or generated by at least one of other components in a non-volatile memory.

Each of the WiFi module 223, the BT module 225, the GPS module 227, and the NFC module 228 may include, for example, a processor for processing data transmitted/received through the corresponding module. Although the cellular module 221, the WiFi module 223, the BT module 225, the GPS module 227, and the NFC module 228 are illustrated as blocks separate from each other in FIG. 8, at least some (for example, two or more) of the cellular module 221, the WiFi module 223, the BT module 225, the GPS module 227, and the NFC module 228 may be included in one Integrated Chip (IC) or one IC package according to one embodiment. For example, at least some (for example, the communication processor corresponding to the cellular module 221 and the WiFi processor corresponding to the WiFi module 223) of the processors corresponding to the cellular module 221, the WiFi module 223, the BT module 225, the GPS module 227, and the NFC module 228 may be implemented by one SoC.

The RF module 229 transmits/receives data, for example, an RF signal. Although not illustrated, the RF module 229 may include, for example, a transceiver, a Power Amp Module (PAM), a frequency filter, a Low Noise Amplifier (LNA) or the like. Further, the RF module 229 may further include a component for transmitting/receiving electronic waves over a free air space in wireless communication, for example, a conductor, a conducting wire, or the like. Although the cellular module 221, the WiFi module 223, the BT module 225, the GPS module 227, and the NFC module 228 share one RF module 229 in FIG. 2, at least one of the cellular module 221, the WiFi module 223, the BT module 225, the GPS module 227, and the NFC module 228 may transmit/receive an RF signal through a separate RF module according to one embodiment.

The SIM card 224 is a card including a Subscriber Identification Module and may be inserted into a slot formed in a particular portion of the electronic device. The SIM card 224 includes unique identification information (for example, Integrated Circuit Card IDentifier (ICCID)) or subscriber information (for example, International Mobile Subscriber Identity (IMSI).

The memory 230 (for example, memory 130) may include an internal memory 232 or an external memory 234. The internal memory 232 may include, for example, at least one of a volatile memory (for example, a Random Access Memory (RAM), a dynamic RAM (DRAM), a static RAM (SRAM), a synchronous dynamic RAM (SDRAM), and the like), and a non-volatile Memory (for example, a Read Only Memory (ROM), a one time programmable ROM (OTPROM), a programmable ROM (PROM), an erasable and programmable ROM (EPROM), an electrically erasable and programmable ROM (EEPROM), a mask ROM, a flash ROM, a NAND flash memory, an NOR flash memory, and the like).

According to an embodiment, the internal memory 232 may be a Solid State Drive (SSD). The external memory 234 may further include a flash drive, for example, a Compact Flash (CF), a Secure Digital (SD), a Micro Secure Digital (Micro-SD), a Mini Secure Digital (Mini-SD), an extreme Digital (xD), or a memory stick. The external memory 234 may be functionally connected to the electronic device 200 through various interfaces. According to an embodiment, the electronic device 200 may further include a storage device (or storage medium) such as a hard drive.

The sensor module 240 measures a physical quantity or detects an operation state of the electronic device 201, and converts the measured or detected information to an electronic signal. The sensor module 240 may include, for example, at least one of a gesture sensor 240A, a gyro sensor 240B, an atmospheric pressure (barometric) sensor 240C, a magnetic sensor 240D, an acceleration sensor 240E, a grip sensor 240F, a proximity sensor 240G, a color sensor 240H (for example, Red, Green, and Blue (RGB) sensor) 240H, a biometric sensor 240I, a temperature/humidity sensor 240I, an illumination (light) sensor 240K, and a Ultra Violet (UV) sensor 240M. Additionally or alternatively, the sensor module 240 may include, for example, a E-nose sensor, an electromyography (EMG) sensor, an electroencephalogram (EEG) sensor, an electrocardiogram (ECG) sensor, an Infra-Red (IR) sensor, an iris sensor, a fingerprint sensor (not illustrated), and the like. The sensor module 240 may further include a control circuit for controlling one or more sensors included in the sensor module 240.

The input device 250 includes a touch panel 252, a (digital) pen sensor 254, a key 256, and an ultrasonic input device 258. For example, the touch panel 252 may recognize a touch input in at least one type of a capacitive type, a resistive type, an infrared type, and an acoustic wave type. The touch panel 252 may further include a control circuit. In the capacitive type, the touch panel 252 can recognize proximity as well as a direct touch. The touch panel 252 may further include a tactile layer. In this event, the touch panel 252 provides a tactile reaction to the user.

The (digital) pen sensor 254 may be implemented, for example, using a method identical or similar to a method of receiving a touch input of the user, or using a separate recognition sheet. The key 256 may include, for example, a physical button, an optical key, or a key pad. The ultrasonic input device 258 is a device which can detect an acoustic wave by a microphone (for example, microphone 288) of the electronic device 200 through an input means generating an ultrasonic signal to identify data and can perform wireless recognition. According to an embodiment, the electronic device 200 receives a user input from an external device (for example, computer or server) connected to the electronic device 200 by using the communication interface 220.

The display 260 (for example, display 160) includes a panel 262, a hologram device 264, and a projector 266. The panel 262 may be, for example, a Liquid Crystal Display (LCD) or an Active Matrix Organic Light Emitting Diode (AM-OLED). The panel 262 may be implemented to be, for example, flexible, transparent, or wearable. The panel 262 may be configured by the touch panel 252 and one module. The hologram device 264 shows a stereoscopic image in the air by using interference of light. The projector 266 projects light on a screen to display an image. For example, the screen may be located inside or outside the electronic device 200. According to an embodiment, the display 260 may further include a control circuit for controlling the panel 262, the hologram device 264, and the projector 266.

The interface 270 includes, for example, a High-Definition Multimedia Interface (HDMI) 272, a Universal Serial Bus (USB) 274, an optical interface 276, and a D-subminiature (D-sub) 278. The interface 270 may be included in, for example, the communication interface 170 illustrated in FIG. 1. Additionally or alternatively, the interface 290 may include, for example, a Mobile High-definition Link (MHL) interface, a Secure Digital (SD) card/Multi-Media Card (MMC), or an Infrared Data Association (IrDA) standard interface.

The audio module 280 bi-directionally converts a sound and an electronic signal. At least some components of the audio module 280 may be included in, for example, the input/output interface 150 illustrated in FIG. 1. The audio module 280 processes sound information input or output through, for example, a speaker 282, a receiver 284, an earphone 286, the microphone 288 or the like.

The camera module 291 is a device which can photograph a still image and a video. According to an embodiment, the camera module 291 may include one or more image sensors (for example, a front sensor or a back sensor), an Image Signal Processor (ISP) (not shown) or a flash (for example, an LED or xenon lamp).

The power managing module 295 manages power of the electronic device 200. Although not illustrated, the power managing module 295 may include, for example, a Power Management Integrated Circuit (PMIC), a charger Integrated Circuit (IC), or a battery or fuel gauge.

The PMIC may be mounted to, for example, an integrated circuit or an SoC semiconductor. A charging method may be divided into wired and wireless methods. The charger IC charges a battery and prevent over voltage or over current from flowing from a charger. According to an embodiment, the charger IC includes a charger IC for at least one of the wired charging method and the wireless charging method. The wireless charging method may include, for example, a magnetic resonance method, a magnetic induction method and an electromagnetic wave method, and additional circuits for wireless charging, for example, circuits such as a coil loop, a resonant circuit, a rectifier or the like may be added.

The battery fuel gauge measures, for example, a remaining quantity of the battery 296, or a voltage, a current, or a temperature during charging. The battery 296 may store or generate electricity and supply power to the electronic device 200 by using the stored or generated electricity. The battery 296 may include a rechargeable battery or a solar battery. The indicator 297 shows particular statuses of the electronic device 200 or a part (for example, AP 210) of the electronic device 200, for example, a booting status, a message status, a charging status and the like. The motor 298 converts an electrical signal to a mechanical vibration.

Although not illustrated, the electronic device 200 may include a processing unit (for example, GPU) for supporting a module TV. The processing unit for supporting the mobile TV may process, for example, media data according to a standard of Digital Multimedia Broadcasting (DMB), Digital Video Broadcasting (DVB), media flow or the like.

Each of the components of the electronic device according to various embodiments of the present disclosure may be implemented by one or more components and the name of the corresponding component may vary depending on a type of the electronic device. The electronic device according to various embodiments of the present disclosure may include at least one of the above described components, a few of the components may be omitted, or additional components may be further included. Also, some of the components of the electronic device according to various embodiments of the present disclosure may be combined to form a single entity, and thus may equivalently execute functions of the corresponding components before being combined.

Figure 3:
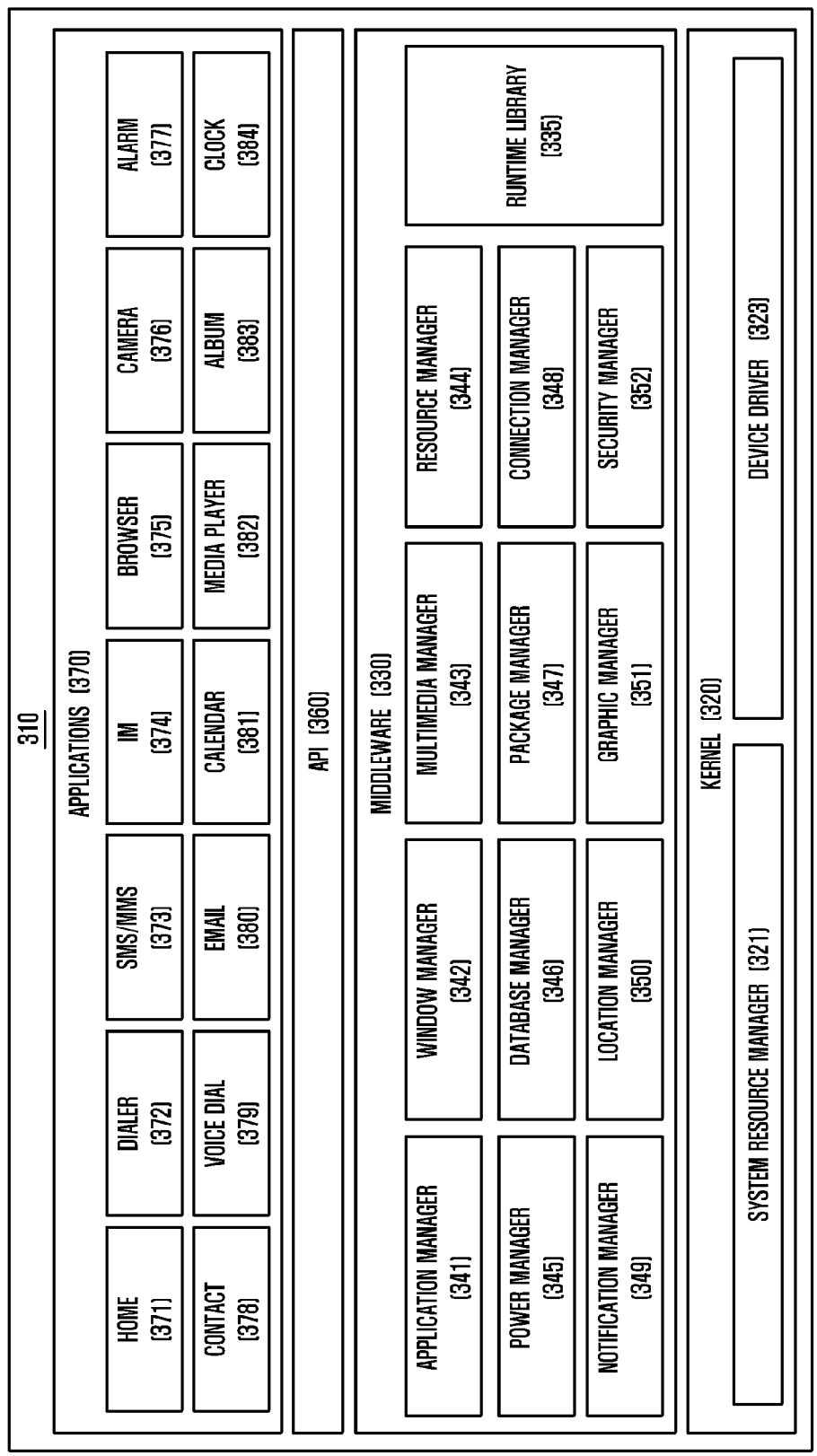
FIG. 3 is a block diagram illustrating a configuration of the program module according to various embodiments of the present disclosure.

FIG. 3 is a block diagram of a programming module 310 according to an embodiment. The programming module 310 (for example, programming module 140) may be included (stored) in the electronic device 100 (for example, memory 130) illustrated in FIG. 1. At least some of the programming module 310 may be formed of software, firmware, hardware, or a combination of at least two of software, firmware, and hardware. The programming module 310 may be executed in the hardware (for example, electronic device 200) to include an Operating System (OS) controlling resources related to the electronic device (for example, electronic device 100) or various applications (for example, applications 370) driving on the OS. For example, the OS may be Android®, iOS®, Windows®, Symbian®, Tizen®, Bada® or the like. Referring to FIG. 3, the programming module 310 includes a kernel 320, a middleware 330, an Application Programming Interface (API) 360, and applications 370.

The kernel 320 (for example, kernel 141) includes a system resource manager 321 and a device driver 323. The system resource manager 321 may include, for example, a process manager, a memory manager, and a file system manager. The system resource manager 321 performs a system resource control, allocation, and recall. The device driver 323 may include, for example, a display driver, a camera driver, a Bluetooth driver, a shared memory driver, a USB driver, a keypad driver, a WiFi driver, and an audio driver. Further, according to an embodiment, the device driver 323 may include an Inter-Process Communication (IPC) driver. The middleware 330 includes a plurality of modules prepared in advance to provide a function required in common by the applications 370. Further, the middleware 330 provides a function through the API 360 to allow the application 370 to efficiently use limited system resources within the electronic device. For example, as illustrated in FIG. 3, the middleware 300 (for example, middleware 143) includes at least one of a runtime library 335, an application manager 341, a window manager 342, a multimedia manager 343, a resource manager 344, a power manager 345, a database manager 346, a package manager 347, a connection manager 348, a notification manager 349, a location manager 350, a graphic manager 351, and a security manager 352. The runtime library 335 includes, for example, a library module used by a complier to add a new function through a programming language while the application 370 is executed. According to an embodiment, the runtime library 335 executes input and output, management of a memory, a function associated with an arithmetic function and the like. The application manager 341 manages, for example, a life cycle of at least one of the applications 370. The window manager 342 manages GUI resources used on the screen. The multimedia manager 343 detects a format required for reproducing various media files and performs an encoding or a decoding of a media file by using a codec suitable for the corresponding format. The resource manager 344 manages resources such as a source code, a memory, or a storage space of at least one of the applications 370.

The power manager 345 operates together with a Basic Input/Output System (BIOS) to manage a battery or power and provides power information required for the operation. The database manager 346 manages generation, search, and change of a database to be used by at least one of the applications 370. The package manager 347 manages an installation or an update of an application distributed in a form of a package file.

The connection manager 348 manages, for example, a wireless connection such as WiFi or Bluetooth. The notification manager 349 displays or notifies a user of an event such as an arrival message, an appointment, a proximity alarm or the like, in a manner that does not disturb the user. The location manager 350 manages location information of the electronic device. The graphic manager 351 manages a graphic effect provided to the user or a user interface related to the graphic effect. The security manager 352 provides a general security function required for a system security or a user authentication. According to an embodiment, when the electronic device (for example, electronic device 100 or 200) has a call function, the middleware 330 may further include a telephony manager for managing a voice of the electronic device or a video call function. The middleware 330 may generate a new middleware module through a combination of various functions of the aforementioned internal component modules and use the generated new middleware module. The middleware 330 may provide a module specified for each type of operating system to provide a differentiated function. Further, the middleware 330 may dynamically delete some of the conventional components or add new components. Accordingly, some of the components described in the embodiment of the present disclosure may be omitted, replaced with other components having different names but performing similar functions, or other components may be further included.

The API 360 (for example, API 145) is a set of API programming functions, and may be provided with a different configuration according to an operating system. For example, in Android® or iOS®, a single API set may be provided for each platform. In Tizen®, two or more API sets may be provided. The applications 370, which may include an application similar to the application 134, may include, for example, a preloaded application and/or a third party application. The applications 370 may include a home application 371 a dialer application 372, a Short Messaging Service (SMS)/Multimedia Messaging Service (MMS) application 373, an Instant Messaging (IM) application 374, a browser application 375, a camera application 376, an alarm application 377, a contact application 378, a voice dial application 379, an email application 380, a calendar application 381, a media player application 382, an album application 383, and a clock application 384. However, the present embodiment is not limited thereto, and the applications 370 may include any other similar and/or suitable application. At least a part of the programming module 310 can be implemented by commands stored in computer-readable storage media. When the commands are executed by at least one processor, e.g. the AP 210, at least one processor can perform functions corresponding to the commands. The computer-readable storage media may be, for example, the memory 230. At least a part of the programming module 310 can be implemented, e.g. executed, by, for example, the AP 210. At least a part of the programming module 310 may include, for example, a module, a program, a routine, a set of instructions and/or a process for performing at least one function.

The titles of the aforementioned elements of the programming module, e.g. the programming module 300, according to the present disclosure may vary depending on the type of the OS. The programming module according to the present disclosure may include at least one of the aforementioned elements and/or may further include other additional elements, and/or some of the aforementioned elements may be omitted. The operations performed by a programming module and/or other elements according to the present disclosure may be processed through a sequential, parallel, repetitive, and/or heuristic method, and some of the operations may be omitted and/or other operations may be added.

Figure 4:
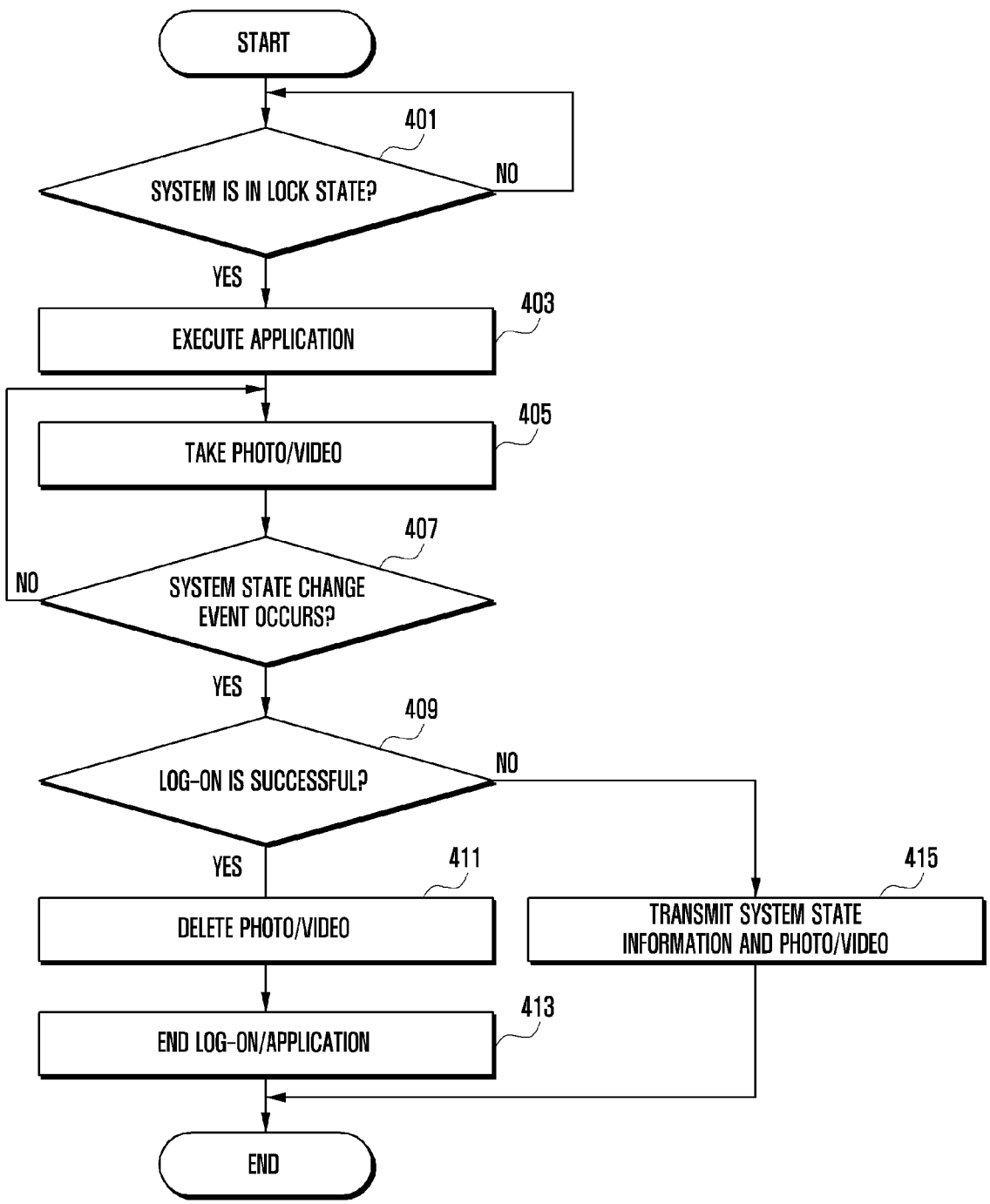
FIG. 4 is a flowchart illustrating an electronic device monitoring method according to various embodiments of the present disclosure.

FIG. 4 is a flowchart illustrating an electronic device monitoring method according to various embodiments of the present disclosure.

The electronic device 201 may determine whether the system is in the lock state according to a command (or control) of the processor 210 at operation 401. The lock state may be identical with or similar to an authentication standby state or an authentication mode. The electronic device 201 may display a lock screen on the display 260 in the system lock state. According to various embodiments, the lock screen may present at least one of an authorized user name, an interface item for receiving user authentication information, and an interface item for notifying the user that the electronic device 201 is running in the authentication mode (e.g., the security camera (i.e., camera module 291) is activated).

According to various embodiments, if no user input is made through the input device 250 or the input/output interface 150 during a predetermined time period, the electronic device may lock the system. If a user input for locking the system is received through the input device 250 or the input/output interface 150, the electronic device 201 may control such that the system is running in the lock state. If the user logs off, the electronic device 201 may control such that the system is running in the lock state. If the system boots up and loads the operating system, the electronic device may control such that the system starts in the lock state.

The electronic device 201 may be configured to enter a power saving mode when no user input is detected during the predetermined time period or a user input request for entering the power saving mode is detected. If a user input is detected in the power saving mode, the electronic device 201 may wake up from the power saving mode and operate in the lock state.

If it is determined that the system is not in the lock state at operation 401, the electronic device 201 continues the operation in progress.

If it is determined that the system is in the lock state at operation 401, the procedure goes to operation 403.

The electronic device may execute an application according to a command (e.g., control) from the processor 210 at operation 403. According to various embodiments, the electronic device 201 may execute an application (e.g., the security module 520) according to a command (e.g., control) from the processor 210. According to various embodiments, the electronic device 201 may activate the camera (e.g., camera module 291) to acquire an image and activate the security module 520 to transmit/receive an email according to a command (control) from the processor 210.

The electronic device 201 may take or acquire an outside image, a photo, or a video using the camera module 291 according to a command from the processor 210 at operation 405.

According to various embodiments, the electronic device 201 may take an image including at least one object using the camera module 291 according to a command (e.g., control) from the processor 210. According to various embodiments, the electronic device 201 may store the acquired image in the memory 230 according to a command (e.g., control) from the processor 210. According to various embodiments, the electronic device 101 may determine whether the image acquired according to a command (e.g., control) from the processor 210 includes at least one object and, if so, store the acquired image in the memory 230.

According to various embodiments, the memory 230 may include a Hard Disc Drive (HDD) and a Solid State Drive (SSD). The electronic device 201 may store the acquired image in a non-volatile memory, a hard disc drive, or a solid state drive.

According to various embodiments, the electronic device 201 may take images, photos, or videos at a predetermined interval.

According to various embodiments, the electronic device 201 may store information on the attributes of the photos or videos taken by the camera module 291. For example, the attributes may include at least one of acquisition time, acquisition location, and size of the images, photos, or videos.

The electronic device 201 may determine whether a system state change event is detected according to a command (e.g., control) from the processor 210 at operation 407. For example, the system state change event may be an event triggering release of the lock state.

According to various embodiments, the system state change event may be an input of user authentication information for releasing the lock state.

According to various embodiments, the electronic device 201 may receive the authentication information through the user authentication input interface item displayed on the lock screen. The user authentication information may include at least one of a password, pattern information, iris information, and fingerprint information. The user authentication information may also include at least one or a combination of a password, pattern information, voice information, iris information, and fingerprint information.

According to various embodiments, the electronic device 201 may include at least one of the input device 250, the input/output interface 150, the keypad (e.g., keys 256), and a fingerprint sensor (e.g., biometric sensor 240I). The input device 250 or the input/output interface 150 may include at least one or a combination of the keypad (e.g., keys 256), the touch pad (e.g., touch panel 252), the microphone 288, the iris sensor (e.g., biometric sensor 240I), and the fingerprint sensor (e.g., biometric sensor 240I).

If it is determined that no system state change event is detected at operation 407, the procedure returns to operation 405.

If it is determined that the system state change information is detected at operation 407, the procedure goes to operation 209.

The electronic device 201 may determine whether the log-on is successful according to a command (e.g., control) from the processor at operation 409.

According to various embodiments, the electronic device 201 may compare the user authentication information acquired through the system state change event and the user authentication information stored in the memory 230 and, if the authentication information matches, determine that the log-on is successful.

According to various embodiments, the electronic device 201 may compare the user authentication information acquired from the system state change event and the user authentication information stored in the memory 230 and, if the information does not match, determine that the log-on has failed.

According to various embodiments, the memory 230 may include at least one of a Hard Disc Drive (HDD) and a Solid State Drive (SSD). For example, the electronic device 201 may store the user authentication information in a non-volatile memory, an HDD, or a SSD.

If it is determined that the log-on is successful at operation 409, the electronic device 201 may release the lock state. According to various embodiments, if it is determined that the log-on is successful, the electronic device 201 may control such that the lock screen is released.

If it is determined that the log-on has failed at operation 409, the procedure goes to operation 415.

At operation 415, the electronic device 201 may transmit system state information and the acquired images, photos, or videos to an external device (e.g., server 106), a cloud device, or other electronic devices 102 and 104 by means of the communication module 220 according to a command (e.g., control) from the processor 210. The cloud device may be an external device in view of the electronic device 201 using a cloud computing system.

According to various embodiments, if the log-on succeeds within a predetermined time after the initial log-on failure at operation 409, the electronic device 201 may skip operation 415 for transmitting the system state information and the acquired images, photos, or videos to an external device (e.g., server 106), a cloud device, or other electronic devices 102 and 104.

According to various embodiments, if the log-on fails because of the mismatch between the user authentication information acquired from the system state change event and the user authentication information stored in the memory 230, the electronic device 201 may transmit the image, photo, or video acquired during a predetermined time period before the log-on failure time point to an external electronic device (e.g., server 106), a cloud device, or other electronic devices 102 and 104. For example, the electronic device 201 may transmit the images, photos, or videos acquired for 5 minutes preceding the log-on failure time point to an external device (e.g., server 106), a cloud device, or other electronic devices 102 and 104.

According to various embodiments, if the log-on fails because of the mismatch between the user authentication information acquired through the system state change event and the user authentication information stored in the memory 230, the electronic device 201 may transmit the image, photo, or video acquired during a predetermined time period starting at a time point before the log-on failure and ending at a time point after the log-on failure to an external device (e.g., server 106), a cloud device, or other electronic devices 102 and 104. For example, the electronic device 201 may transmit the images, photos, or videos acquired for 10 minutes, 5 minutes preceding the log-on failure and 5 minutes following the log-on failure, to an external device (e.g., server 106), a cloud device, or other electronic devices 102 and 104.

According to various embodiments, the electronic device 201 may take images, photos, or videos by means of the camera module 291 at a predetermined interval, e.g., interval of 10 seconds. In this case, 30 images, photos, or videos may be acquired 5 minutes before log-on failure.

According to various embodiments, the system state information and the acquired images, photos, or videos may be transmitted to an external electronic device (e.g., server 106), a cloud device, or other electronic devices 102 and 104 by means of a message (e.g., email message, Short Message Service (SMS) message, Multimedia Message Service (MMS) message, Instant Messenger (IM) message, and Social Network Service (SNS) message). The information on the message (e.g., email message, SMS message, MMS message, IM message, and SNS message) such as contact information, email address, and phone number entered by the user may be stored in advance.

According to various embodiments, the system state information may include at least one of monitoring start and stop information, use attempt information, and current system state.

According to various embodiments, if the system state information and acquired images, photos, or videos are transmitted to an external electronic device (e.g., server 106), a cloud device, and other electronic devices 102 and 104, the electronic device 201 may control the display unit 260 to display a warning notification according to a command (e.g., control) from the processor 210. For example, the warning notification may be a message notifying that the system state information and acquired images, photos, or videos have been transmitted to the external electronic device (e.g., server 106), cloud device, or other electronic devices 102 and 104.

According to various embodiments, if the number of log-on failures reaches a predetermined value, the electronic device 201 may display a warning notification on the display 260 according to a command (e.g., control) of the processor 210.

If the log-on is successful at operation 409, the procedure goes to operation 411.

At operation 411, the electronic device 201 may delete the acquired images, photos, or videos according to a command (e.g., control) from the processor 210.

According to various embodiments, if the log-on is successful, the electronic device 201 may delete the stored images, photos, or videos according to a command (e.g., control) from the processor 210.

According to various embodiments, if the log-on is successful, the electronic device 201 may delete the acquired images, photos, or videos selectively according to a command (or control) from the processor 210.

According to various embodiments, if the log-on is successful, the electronic device 201 may delete the acquired images, photos, or videos periodically according to a command (e.g., control) from the processor 210.

According to various embodiments, if the log-on is successful, the electronic device 201 may delete the acquired images, photos, or videos based on the attribute information. For example, the electronic device 201 may delete the images, photos, or videos acquired earlier than a predetermined time point with priority in comparison with the images, photos, or videos acquired later than the predetermined time point based on the time-related attribute information of the acquired images, photos, or videos. For example, the electronic device 201 may delete the images, photos, or videos larger than a predetermined size (e.g., 5 MB) as a priority in comparison with the images, photos, or videos smaller than the predetermined size (e.g., 5 MB) based on the size-related attribute information of the acquired images, photos, or videos.

The electronic device 201 may terminate the log-on operation and application execution according to a command (e.g., control) from the processor 210 at operation 413.

According to various embodiments, at least one of operations 401 to 415 may be omitted. For example, operation 411 may be omitted.

At least part of the operations (i.e., operations 401 to 415) constituting the procedure of FIG. 4 may be performed in a sequential, parallel, repetitive, or heuristic manner. For example, the operations constituting the procedure of FIG. 4 may be performed in a different order or with omission of some operations or addition of at last one new operation.

According to various embodiments, the electronic device monitoring method may include receiving a request for displaying a lock screen, activating the camera module 291 that is functionally connected to the electronic device 201, taking an image including at least one object using the activated camera module 291, receiving an input made through an input interface (e.g., input/output interface 150 or input device 250) that is functionally connected to the electronic device 201, comparing the input with the authentication information, and transmitting, when the input mismatches the authentication information, the acquired images to an external electronic device (e.g., server 106), a cloud device, or other electronic devices 102 and 104.

According to various embodiments, the electronic device monitoring method may further include releasing, when the input matches the authentication information, the lock screen.

According to various embodiments, the electronic device monitoring method may further include deleting, when the input matches the authentication information, the acquired images selectively.

According to various embodiments, the electronic device monitoring method may further include checking attribute information of the acquired images and deleting the acquired images selectively based on the attribute information.

According to various embodiments, the electronic device monitoring method may further include determining whether the acquired images include a predetermined object and, if so, storing the acquired images in the memory 230.

According to various embodiments, the images may be acquired at a predetermined interval.

According to various embodiments, activating the camera module may include controlling the display 260 to display the lock screen.

According to various embodiments, the acquired images may be the images acquired at a predetermined time before a time point when the input mismatches the authentication information.

Figure 5:
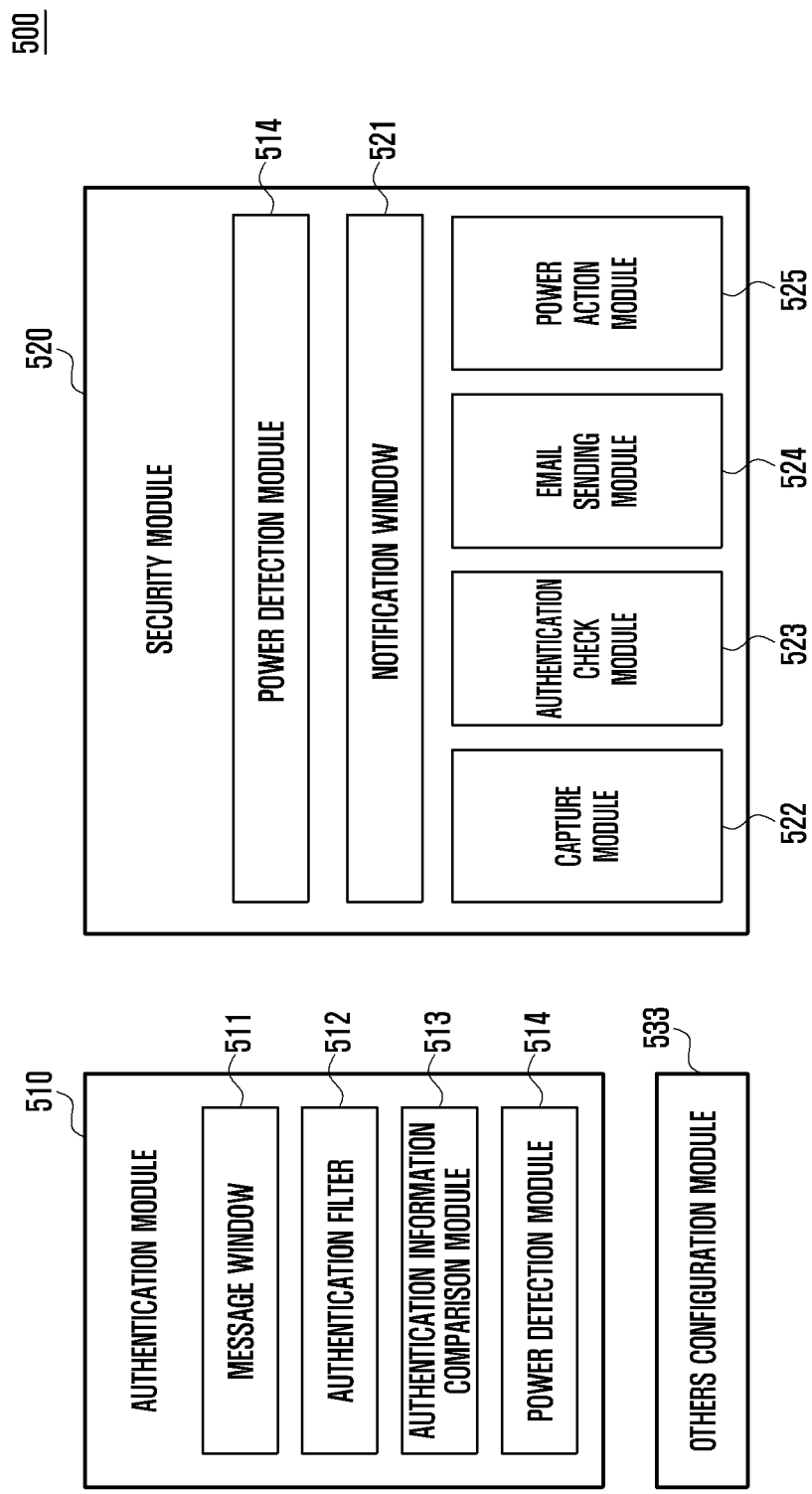
FIG. 5 is a block diagram illustrating a monitoring module of the electronic device according to various embodiments of the present disclosure.

FIG. 5 is a block diagram illustrating a monitoring module of the electronic device according to various embodiments of the present disclosure.

The monitoring module 500 may include an authentication module 510, a security module 520, and an others configuration module 533.

According to various embodiments, the others configuration module 533 may be included in the monitoring module 500 independently or in the security module 520. The respective modules may be implemented as independent modules.

The authentication module 510 may include at least one of a message window 511, an authentication filter (credential filter for security camera) 512, an authentication information comparison module 513, and a power detection module (power event detect module) 514. According to various embodiments, the power detection module 514 may be included in the security module 520 rather than in the authentication module 510.

According to an embodiment, the authentication module 510 may be implemented with omission of at least one of the aforementioned components or addition of at least one other component.

The authentication module 510 may control execution of the security module, perform backup of the power setting of the electronic device 201, and detect change of power status. The power status change detection may be of detecting a state change of the electronic device 201 such as close of the lid, entry to the power saving mode, power-off, detachment of the power cord, and location change.

The authentication module 510 may receive a user input made through the authentication module interface and execute an action corresponding to the user input. The authentication module may receive authentication information input through the authentication module interface. The authentication information is transferred to an application (e.g., WinLogon.exe) via an authentication User Interface (UI), and the application determines whether the log-on is successful according to an authentication test result.

According to various embodiments, if a user input is not detected during a predetermined time period, the electronic device 201 may turn off the display 260 or enter the power saving mode. The electronic device 202 may turn off the display 260 or enter the power saving mode at a predetermined timing or in response to a user input.

According to various embodiments, if a power button press input is detected, the electronic device 201 may do nothing, enter the power saving mode or maximum power saving mode, end the system, or turn off the display 260. The electronic device 201 may do nothing, enter the power saving mode or maximum power saving mode, end the system, or turn off the display 260 at a predetermined timing or in response to a user input.

According to various embodiments, if a power button press input is detected, the electronic device 201 may do nothing, enter the power saving mode or maximum power saving mode, or turn off the display 260. The electronic device 201 may do nothing, enter the power saving mode or maximum power saving mode, or turn off the display 260 at a predetermined timing or in response to a user input.

According to various embodiments, in the case that the electronic device 201 is a laptop computer, when it is detected that the lid of the laptop is open, the laptop computer may do nothing, enter the power saving mode or maximum power saving mode, or end the system. The laptop computer may do nothing, enter the power saving mode or maximum power saving mode, or end the system at a predetermined timing or in response to a user input.

According to various embodiments, the message window 511 may send and receive messages between the authentication filter 512 and/or authentication information comparison module 513 and security module 520. The message window 511 may send and receive messages between the authentication filter 512 and the security module 520. The message window 511 may send and receive messages between the authentication information comparison module 513 and the security module 520.

According to various embodiments, after executing the security module 520, the authentication module 510 may control the notification window 521 included in the security module 520 through the message window 511. After executing the security module, the authentication module 510 may transmit/receive a message through the message window 511 to show or hide the notification window 521 included in the security module 520. The authentication module 510 may transmit/receive a message through the message window 511 to activate or deactivate the capture module 522.

The message window 511 may exchange messages with the authentication filter 512, which is capable of checking whether the security module 520 is on/off. The authentication module 510 may control the operation of the security module 520 based on the message exchanged through the message window 511. The message window 511 may control the security module 520 to transmit the system state information and acquired images, photos, or videos to an external electronic device (e.g., server 106), a cloud device, or other electronic devices 102 and 104.

According to various embodiments, the authentication information comparison module 513 may compare the user authentication information acquired from the system state change event and the user authentication information stored in the memory 230 and, if the user authentication information matches, determine that the log-on is successful. If it is determined that the log-on is successful, the authentication module 510 may release the lock state and control the electronic device 210 to end the operation of the security module 520.

According to various embodiments, if it is determined that the log-on is successful by means of the authentication information comparison module 513 or the authentication check module 523, the security module 520 may control the electronic device 201 to delete the acquired images, photos, or videos.

According to various embodiments, the authentication information comparison module 513 may compare the user authentication information acquired from the system state change event and the user authentication information stored in the memory 230 and, if the number of information mismatches reaches a predetermined value, determine that the log-on has failed. If it is determined that the log-on has failed, the authentication module 510 may control the electronic device 201 to not receive the user authentication information during a predetermined time period. If it is determined that the log-on has failed, the authentication module 510 may control the security module 520 to transmit the system state information and acquired images, photos, or videos to an external electronic device (e.g., server 106), a cloud device, or electronic devices 102 and 104.

Figure 6:
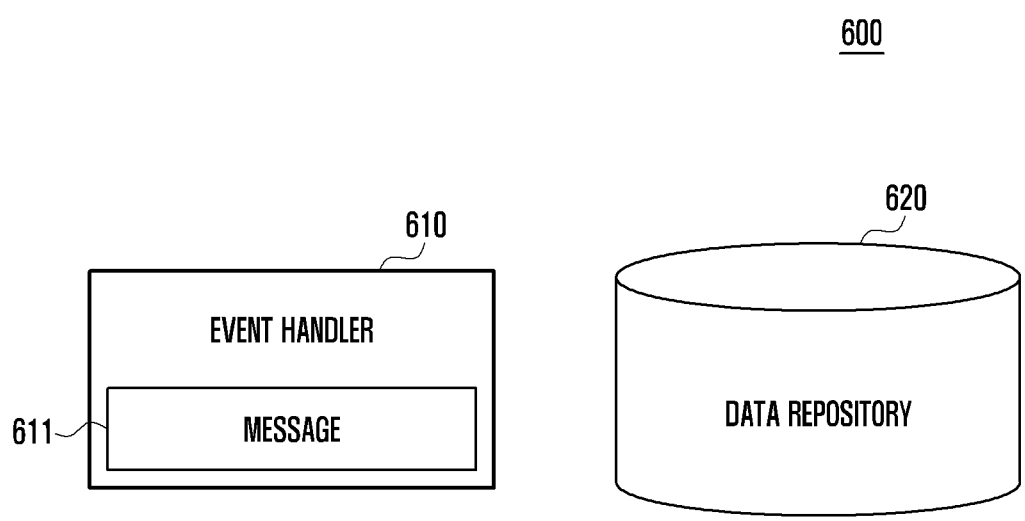
FIG. 6 is a block diagram illustrating a post-authentication module of the monitoring module of the electronic device according to various embodiments of the preset disclosure

According to various embodiments, the security module 520 may store the information indicating whether to transmit the system state information and the acquired images, photos, or videos in a data repository 620 (see FIG. 6).

According to various embodiments, the power detection module 514 may detect change in the power state of the electronic device. For example, the power detection module 514 may detect a state change of the electronic device 201 such as close of the lid, entry to the power saving mode, power-off, detachment of the power charging cord, and location change.

According to various embodiments, the power detection module 514 may detect the close of the lid, regardless of the log-on success, and control the electronic device 201 (i.e., security module 520) to transmit the system state information and the acquired images, photos, or videos to an external electronic device (e.g., server 106), a cloud device, or other electronic devices 102 and 104.

According to various embodiments, if the power detection module 514 detects the change in the power state of the electronic device 201, the authentication module 510 performs backup of the operation to be executed and then changes the current settings for a standby state (do-nothing). After transitioning the operation state to the standby state, the authentication module 510 may control the electronic device 201 to transmit the system state information and the acquired images, photos, or videos to an external electronic device (e.g., server 106), a cloud device, or other external devices 102 and 104 with address information (e.g., email address and phone number) registered by the user or display a warning alarm in a predetermined manner.

According to various embodiments, the security module 520 may include at least one of a notification window 521, a capture module 522, a credential checking module 523, an email sending module 524, a power detection module 514, and a power action module 525. According to an embodiment, the security module 520 may be implemented with omission of at least one of the aforementioned components or addition of at least one other component.

According to various embodiments, if the security module is running, the notification window 521 may control such that the display 260 displays information indicating that the electronic device 201 is operating in the authentication mode or the camera module 291 is running. According to various embodiments, the capture module 522 may control the camera module 291 to take images, photos, or videos.

According to various embodiments, the credential checking module 523 may check the state of the authentication module 510. The credential checking module 523 may check the operation state of the authentication module 510.

According to various embodiments, if it is determined that the log-on has failed, the email sending module 524 may transmit the system state information and the acquired images, photos, or videos to an external electronic device (e.g., server 106), a cloud device, or other electronic devices 102 and 104.

According to various embodiments, if it is determined that the power state is changed, the email sending module 524 may transmit the system state information and the acquired images, photos, or videos to an external electronic device (e.g., server 106), a cloud device, or other electronic devices 102 and 104.

According to various embodiments, if the system state information and the acquired images, photos, or videos are transmitted to an external electronic device (e.g., server 106), a cloud device, or other electronic devices 102 and 104 by means of the email sending module 524, the power action module 525 may activate a predetermined power mode.

According to various embodiments, the monitoring module 500 may include at least one of an authentication module addition/deletion module and an on/off configuration module. The authentication module addition/deletion module may control to add or delete the authentication module 510. The on/off configuration module may determine whether to turn on/off the device monitoring operation and record the on/off of the corresponding account in the data repository 620 for use later by the authentication module 510 in determining whether to activate the monitoring module 500. The others configuration module 533 may configure a threshold for a number of notification transmission reference authentication attempts, an image acquisition time interval, an acquired image data storage location, an imaged data storage amount, a number of notifications, a notification method, and an external electronic device to receive a notification message. If the external electronic device configured to receive the notification message is a fixed terminal having Internet access capability, the others configuration module 533 may configure an Internet Protocol (IP) address of the external electronic device. The others configuration module 533 may also configure a flash function on/off setting, an image resolution, a number of image frames per second, and an image transmission interval.

Although all of the authentication module 510, the security module 520, and the others configuration module 533 are depicted as components included in one electronic device 201, the configuration of the electronic device 201 according to various embodiments of the present disclosure is not limited thereto. For example, at least one or part of the authentication module 510, the security module 520, and the others configuration module 533 may be included in the electronic device 201 and an external electronic device (e.g., first external electronic device 102, second electronic device 104, and server 106) in a distributed manner.

According to various embodiments, at least one of the authentication module 510, the security module 520, and the others configuration module 533 may be implemented in the form of one or any combination of software, firmware, and hardware. At least one of the authentication module 510, the security module 520, and the others configuration module 533 may be implemented (or executed) by the processor (e.g., processor 120). At least one of the authentication module 510, the security module 520, and the others configuration module 533 may include a set of modules, programs, routines, commands (instructions), or processes.

According to various embodiments, the electronic device 201 may include the memory 230 for storing authentication information for the users of various types of electronic devices 201, the camera module 291, the input interface (e.g., input/output interface 150 or input device 250), and the processor 210; the processor 210 may be configured to receive a request for displaying a lock screen, activate the camera module 291 according to the request, acquire images including at least one object by means of the camera module 291, receive an input made through the input interface (e.g., input/output interface 150 and input device 250), compare the input with the authentication information, and transmit, when the input matches the authentication information, the acquired images to an external electronic device.

According to various embodiments, if the input matches the authentication information, the processor 210 may control the electronic device 210 to release the lock screen.

According to various embodiments, the processor 210 may be configured to delete, when the input matches the authentication information, the acquired images selectively.

According to various embodiments, the processor 210 may be configured to check the attribute information of the acquired images and delete the images selectively based on the attribute information.

According to various embodiments, the processor 210 may be configured to check whether the acquired images include a predetermined object and, if so, store the acquired images in the memory 230.

According to various embodiments, the processor 210 may be configured to acquire the images at a predetermined interval.

According to various embodiments, the electronic device 201 may further include a display 260, and the processor 210 may be configured to control the display 260 to display the lock screen as part of the operation of activating the camera module 291.

According to various embodiments, the input interface (e.g., input/output interface 150 and input device 250) may include at least one or any combination of a keypad (e.g., keys 256), a touch pad (e.g., touch panel 252), an iris sensor (e.g., biometric sensor 240I), a fingerprint sensor (e.g., biometric sensor 240I), and a microphone 288; the authentication information may include at least one or any combination of a password, pattern information, iris information, fingerprint information, and voice information.

According to various embodiments, the processor 210 may be configured to transmit the images acquired at a predetermined time before detecting the mismatch between the input and the authentication information.

According to various embodiments, the processor 210 may be configured to delete the acquired images periodically when the input matches the authentication information.

FIG. 6 is a block diagram illustrating a post-authentication module of the monitoring module of the electronic device according to various embodiments of the preset disclosure.

According to various embodiments, the post-authentication module 600 may include at least one of an event handler 610 and a data repository 620. According to an embodiment, the post-authentication module 600 may be implemented with omission of at least one of the aforementioned components or addition of at least one other component.

The event handler 610 may include a message 611 and, if the system state information and the acquired images, photos, or videos are transmitted to an external electronic device (e.g., server 106), a cloud device, or other electronic devices 102 and 104 by means of the email sending module 524, notify the user of the transmission of the system state information and the acquired images, photos, or videos. If the system state information and the acquired images, photos, or videos are transmitted to the external electronic device (e.g., server 106), cloud server, or the other external electronic devices 102 and 104 by means of the email sending module 524, the data repository 620 may store the information indicating that the email has been transmitted.

Figure 7:
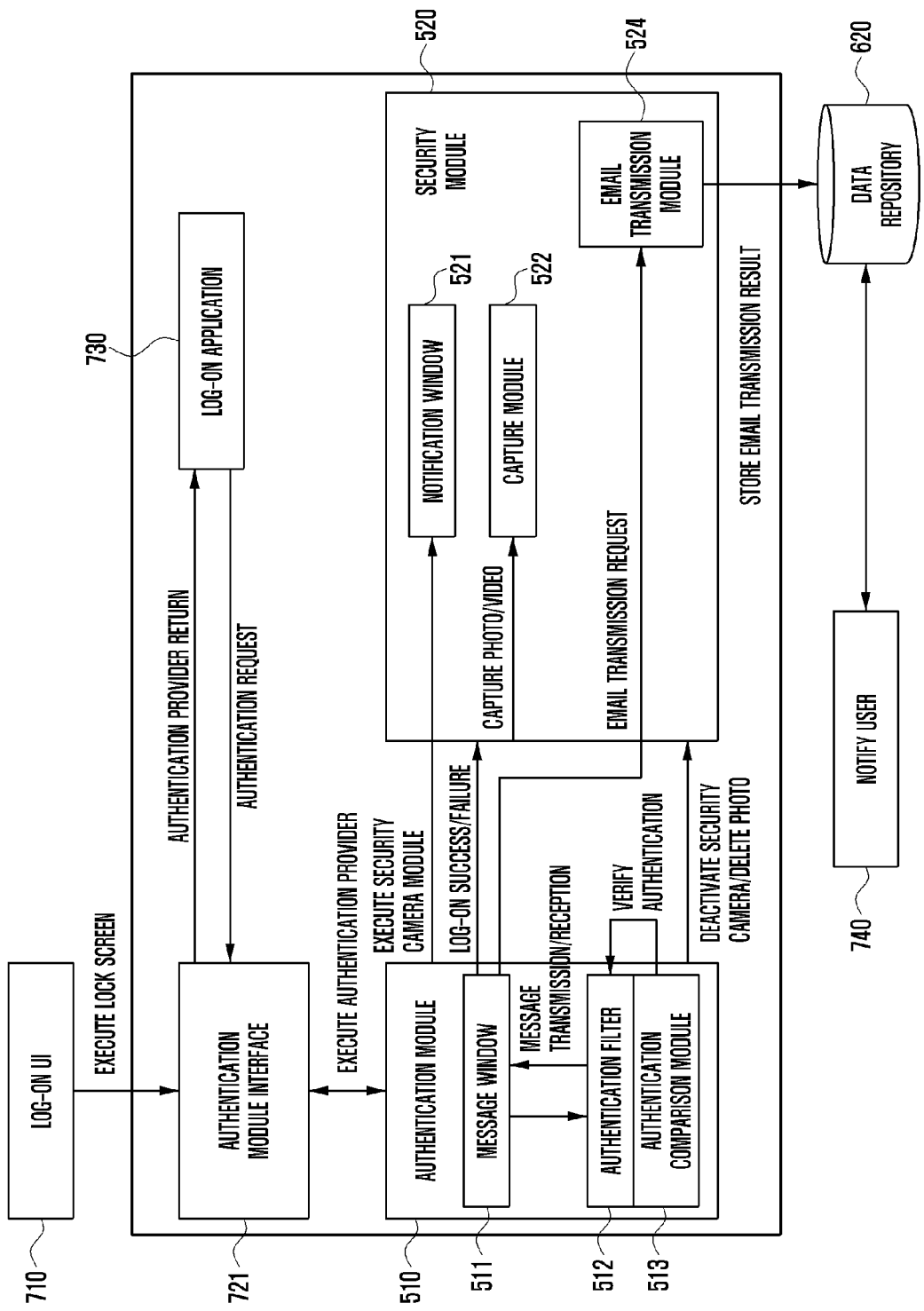
FIG. 7 is a diagram illustrating internal operations of the monitoring module in association with user authentication according to various embodiments of the present disclosure.

FIG. 7 is a diagram illustrating internal operations of the monitoring module in association with user authentication according to various embodiments of the present disclosure.

According to various embodiments, the electronic device 201 may activate a log-on User Interface (UI) 710. The log-on UI 710 may be a lock screen UI. If the lock screen is activated, an authentication module interface 721 may be executed. The authentication module interface 721 may receive an authentication request by means of a log-on application 730 and may return an authentication provider (e.g., authentication module 510) to the log-on application 730.

According to various embodiments, the authentication module interface 721 may request to execute the authentication module 510 according to a user input. The authentication module 510 may display or provide the execution result of the authentication module interface 721.

According to various embodiments, the authentication module 510 may request for execution of the security module 520. If the security module is running in response to the request for executing the security module 520, the notification window 521 of the security module 520 may control the display 260 to display the information indicating that the authentication mode or the camera module 291 is running.

According to various embodiments, if it is requested to execute the security module 520, the capture module 522 of the security module 520 may control the camera module 291 to take images, photos, or videos.

The authentication interface 721 may receive authentication information by means of the authentication module 510. The received authentication information may be sent to the log-on application 730 via the authentication UI. The log-on application 730 (e.g., WinLogon.exe) may check the authentication information and determine whether the log-on is successful based on the check result. After determining whether the log-on is successful, the log-on application 730 may send the determination result to the authentication module interface 721. The authentication filter 512 may send the determination result acquired from the log-on application 730 to the security module 520 via the message window 511. If the determination result is received via the message window 511, the security module 520 may be deactivated.

According to various embodiments, the authentication information comparison module 513 may send the log-on application 730 the user authentication information via the authentication module interface 721 when the system state is changed. The log-on application 730 may compare the acquired user authentication information with the user authentication information stored in the memory 230 and, if the user authentication information matches, determine that the log-on is successful. The log-on application 730 may also send the determination result to the authentication information comparison module 513. The authentication module 513 may also deactivate the security module 520 via the message window 511.

According to various embodiments, the authentication information comparison module 513 may compare the user authentication information acquired from the system state change event with the user authentication information stored in the memory 230 and, if the number of the mismatches of user authentication information reaches a predetermined value, determine that the log-on has failed. If it is determined that the log-on has failed, the authentication module 510 may control the electronic device 201 to not receive the user authentication information during a predetermined time period. For example, if it is determined that the log-on has failed, the authentication module 510 may request to the email sending module 524 of the security module 520 for transmission of an email. The email sending module 524 may transmit the system state information and the acquired images, photos, or videos to an external electronic device (e.g., server 106), a cloud device, or other electronic devices 102 and 104. The email sending module 524 may store the information on the email transmission in the data repository 620.

According to various embodiments, if the log-on has failed, it may be possible to keep storing in the memory 230 the images, photos, or videos transmitted, by means of the email sending module 524, to the external electronic device (e.g., server 106), a cloud device, or other electronic devices 102 and 104.

According to various embodiments, if it is determined that the log-on has failed, the electronic device 201 may transmit the system state information and the acquired images, photos, or videos to an external electronic device (e.g., server 106), a cloud device, or other electronic devices 102 and 104 by means of the email sending module 524 and erase the transmitted images, photos, or videos from the memory 230. According to various embodiments, if the system state information and the acquired images, photos, or videos are transmitted to an external electronic device (e.g., server 106), a cloud device, or other electronic devices 102 and 104 by means of the email sending module 524, the data repository 620 may notify the user of the email transmission as denoted by reference number 740.

Figure 8:
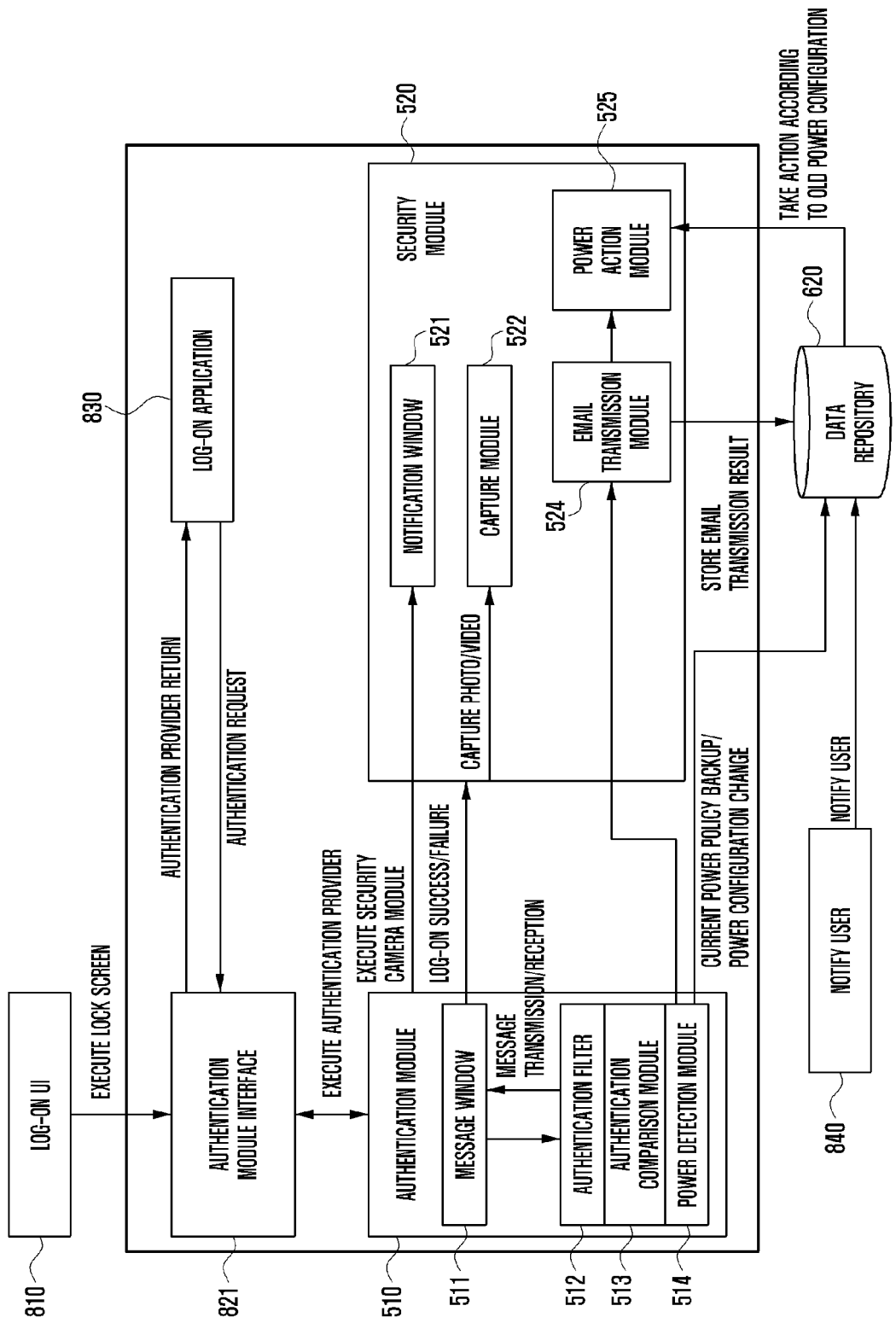
FIG. 8 is a diagram illustrating internal operations of the monitoring module in association with state change event handling according to various embodiments of the present disclosure.

FIG. 8 is a diagram illustrating internal operations of the monitoring module in association with state change event handling according to various embodiments of the present disclosure.

According to various embodiments, the electronic device 201 may execute a log-on User Interface (UI). The log-on UI 810 may be a lock screen UI. The electronic device 201 may execute an authentication module interface 821 in the state that the lock screen is displayed. The authentication module interface 821 may receive an authentication request by means of a log-on application 830 and return an authentication provider (e.g., authentication module 510) to the log-on application 830.

According to various embodiments, the authentication module interface 821 may request for execution of the authentication module according to a user input. The authentication module 510 may control the electronic device 201 to display or provide the execution result of the authentication module interface 821.

According to various embodiments, the authentication module 510 may request for execution of the security module 520. The notification window 521 of the security module 520 may present the information indicating that the authentication mode or the camera module 291 is running by means of the display 260 while the security module 520 is running.

According to various embodiments, the capture module 522 of the security module 520 may control the camera module 291 to acquire images, photos, or videos while the security module 520 is running.

The authentication module interface 821 may receive authentication information via the authentication module. The received authentication information may be sent to a log-on application 830 via the authentication UI. It may be possible to transmit the authentication information to the log-on application 830 (e.g., WinLogon.exe) and determine whether the log-on is successful based on the authentication test result of the log-on application 830.

According to various embodiments, if the system state is changed, the authentication information comparison module 513 may transmit user authentication information to the log-on application 830 via the authentication module interface 821. The log-on application 830 may compare the user authentication information acquired from the state change event with the user authentication information stored in the memory 230 and, if the user authentication information matches, determine that the log-on is successful. The log-on application 830 may send the authentication information comparison module 513 the information indicating that the log-on is successful. The authentication module 513 may end the security module 520 via the message window 511.

According to various embodiments, the power detection module 514 may detect change in the power state of the electronic device 201. For example, the power detection module 514 may detect a state change of the electronic device 201 such as close of the lid, entry to the power saving mode, power-off, detachment of the power charging cord, and location change.

According to various embodiments, if the power detection module 514 detects change in the power state of the electronic device 201, the authentication module 510 may perform backup of the operation to be executed and then change the current settings for a standby state (do-nothing). If the power detection module 514 detects change in the power state of the electronic device 201, the authentication module 510 may store the backup information in the data repository 620. After transitioning the operation state to the standby state, the authentication module 510 may control the electronic device 201 to transmit the system state information and the acquired images, photos, or videos to an external electronic device (e.g., server 106), a cloud device, or other electronic devices 102 and 104 with the address information (e.g., email address and phone number) registered by the user or to display a warning notification in a predetermined manner.

According to various embodiments, the authentication information comparison module 513 may compare the user authentication information acquired from the system state change event with the user authentication information stored in the memory 230 and, if the number of information mismatches reaches a predetermined value, determine that the log-on has failed. If it is determined that the log-on has failed, the authentication module 510 may control the electronic device 201 to not receive the user authentication information during a predetermined time period. If it is determined that the log-on has failed, the authentication module 510 may request to the email sending module 524 of the security module 520 for transmission of an email. The email sending module 524 may transmit the system state information and the acquired images, photos, or videos to an external electronic device (e.g., server 106), a cloud device, or other electronic devices 102 and 104. The email sending module 524 may store the information on the email transmission in the data repository 620. According to various embodiments, if the log-on has failed, it may be possible to keep storing in the memory 230 the images, photos, or videos transmitted, by means of the email sending module 524, to the external electronic device (e.g., server 106), a cloud device, or other electronic devices 102 and 104.

According to various embodiments, if it is determined that the log-on has failed, the electronic device 201 may transmit the system state information and the acquired images, photos, or videos to an external electronic device (e.g., server 106), a cloud device, or other electronic devices 102 and 104 by means of the email sending module 524 and erase the transmitted images, photos, or videos from the memory 230. According to various embodiments, if the system state information and the acquired images, photos, or videos are transmitted to an external electronic device (e.g., server 106), a cloud device, or other electronic devices 102 and 104 by means of the email sending module 524, the power action module 525 may take a predetermined power action.

According to various embodiments, the data repository 620 may control the power action module 525 to take a predetermined power action. If the system state information and the acquired images, photos, or videos are transmitted to an external electronic device (e.g., server 106), a cloud device, or other electronic devices 102 and 104 by means of the email sending module 524, the data repository 620 may notify the user of the email transmission as denoted by reference number 840.

Figure 9:
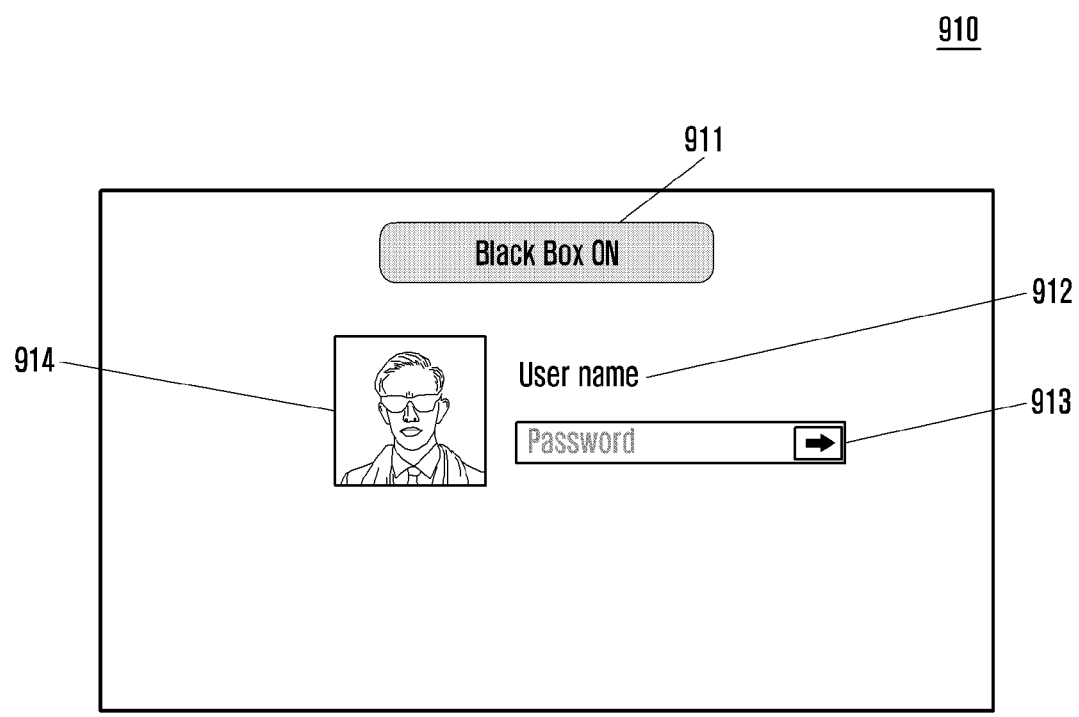
FIG. 9 is a diagram illustrating an authentication mode screen of an electronic device according to various embodiments of the present disclosure.

FIG. 9 is a diagram illustrating an authentication mode screen of an electronic device according to various embodiments of the present disclosure.

According to various embodiments, the electronic device 201 may display an authentication mode screen 910 on the display 260. The authentication mode screen 910 may include at least one of an indication message 911 indicating that the camera module 291 is running, a user name 912, a user authentication information interface 913, and a user profile image 914.

Figure 10:
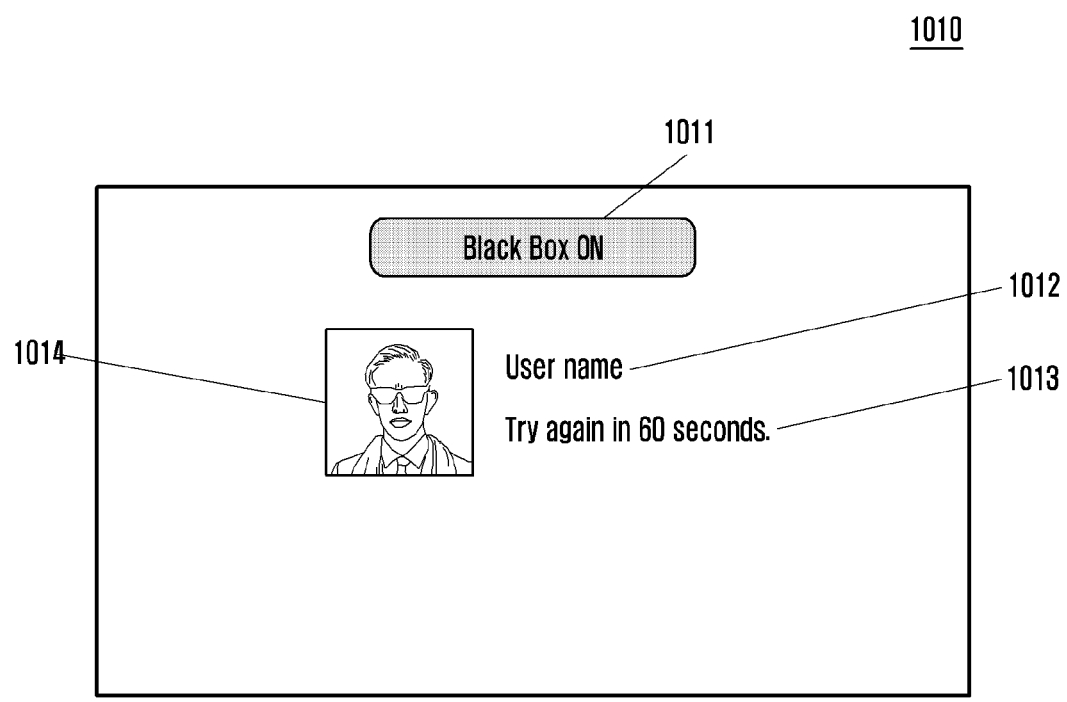
FIG. 10 is a diagram illustrating an authentication mode screen after authentication failure of the electronic device according to various embodiments of the present disclosure.

FIG. 10 is a diagram illustrating an authentication mode screen after authentication failure of the electronic device according to various embodiments of the present disclosure.

According to various embodiments, the electronic device 201 may display an authentication failure-indicative authentication mode screen 1010 on the display 260. The authentication failure-indicative authentication mode screen 1010 may include at least one of an indication message 1011 indicating that the camera module 291 is running, a user name 1012, authentication failure information 1013, and a user profile image 1014. The authentication failure information 1013 may be a message notifying that the authentication is restricted in a predetermined time period (e.g., "Try again in 60 seconds.").

Figure 11:
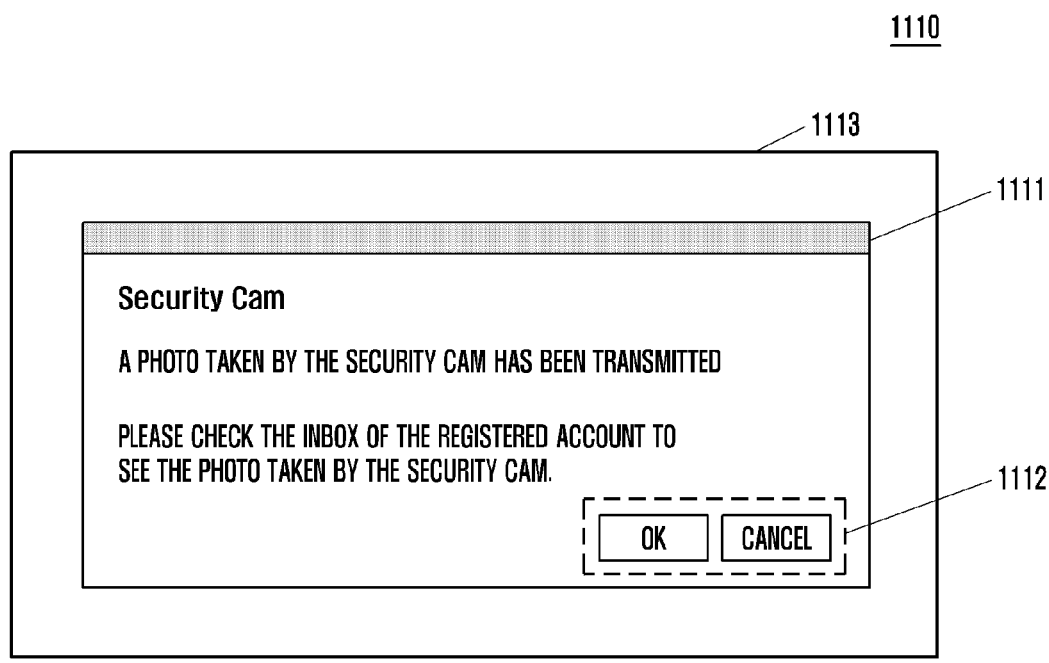
FIG. 11 is a diagram illustrating an authentication mode screen after authentication failure in an authentication reattempt with the image acquired by an electronic device according to various embodiments of the present disclosure.

FIG. 11 is a diagram illustrating an authentication mode screen after authentication failure in an authentication reattempt with the image acquired by an electronic device according to various embodiments of the present disclosure.

According to various embodiments, if the log-on has failed, the electronic device 201 may transmit the system state information and the acquired images, photos, or videos to an external electronic device (e.g., server 106), a cloud device, or electronic devices 102 and 104.

According to various embodiments, if the log-on is successful, the electronic device 201 may display a message indicating that the system state information and the acquired images, photos, or videos have been transmitted to an external electronic device (e.g., server 106), a cloud device, or other electronic devices 102 and 104 in the form of a popup window 1111 on the screen 1113. The popup window 1111 may have an interface item 1112 for accepting or rejecting the recommendation of the message.

Figure 12:
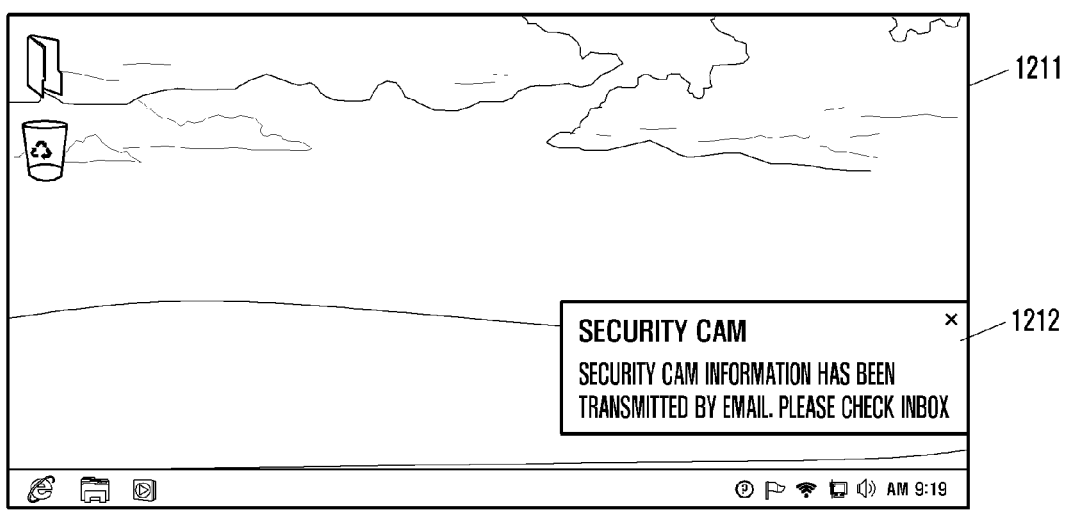
FIG. 12 is a diagram illustrating an authentication mode screen after authentication success in an authentication reattempt with the image acquired by the electronic device according to various embodiments of the present disclosure.

FIG. 12 is a diagram illustrating an authentication mode screen after authentication success in an authentication reattempt with the image acquired by the electronic device according to various embodiments of the present disclosure.

According to various embodiments, if the log on has failed, the electronic device 201 may transmit the system state information and the acquired images, photos, or videos to an external electronic device (e.g., server 106), a cloud device, or other electronic devices 102 and 104.

According to various embodiments, if the log on (e.g., authentication) is successful, the electronic device 201 may display a message in the form of a popup window 1212 on the screen 1211 indicating that the system state information and the acquired images, photos, or videos have been transmitted to an external electronic device (e.g., server 106), a cloud device, or other electronic devices 102 and 104. The popup window 1212 may disappear on the screen 1211 in a predetermined time period (e.g., 3 seconds). According to various embodiments, if an input (e.g., user input) is detected in the popup window 1212, the electronic device 201 may display a screen in association with the input made to the popup window 1212. For example, the electronic device 201 may display an inbox of an email account or execute an application associated with the inbox.

Figure 13:
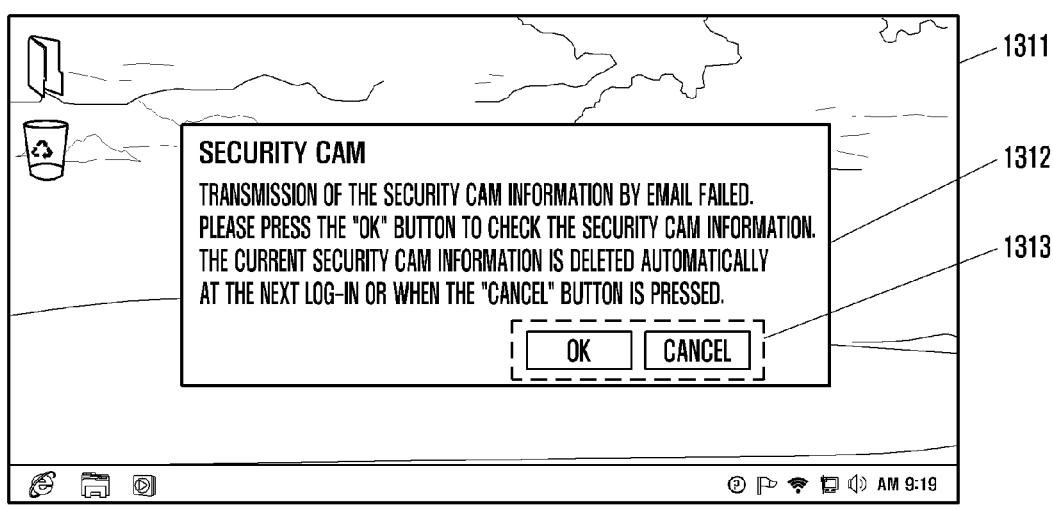
FIG. 13 is a diagram illustrating an authentication mode screen after authentication success in an authentication reattempt with the image acquired by the electronic device according to various embodiments of the present disclosure.

FIG. 13 is a diagram illustrating an authentication mode screen after authentication success in an authentication reattempt with the image acquired by the electronic device according to various embodiments of the present disclosure.

According to various embodiments, if the log-on has failed, the electronic device 201 may attempt to transmit the system state information and the acquired images, photos, or videos to an external electronic device (e.g., server 106), a cloud device, or other electronic devices 102 and 104. At this time, if the electronic device 201 is not connected to a wireless/wired communication network by means of the communication module 220, the electronic device 201 may fail to transmit the system state information and the acquired images, photos, or videos to an external electronic device (e.g., server 106), a cloud device, or other electronic devices 102 and 104.

According to various embodiments, if the log-on (e.g., authentication) is successful, the electronic device 201 may display in the form of a popup window 1312 on the screen 1311 the information indicating the failure of transmitting the system state information and the acquired images, photos, or videos. The popup window 201 may have an interface item 1313 for accepting or rejecting the recommendation of the message.

Figure 14:
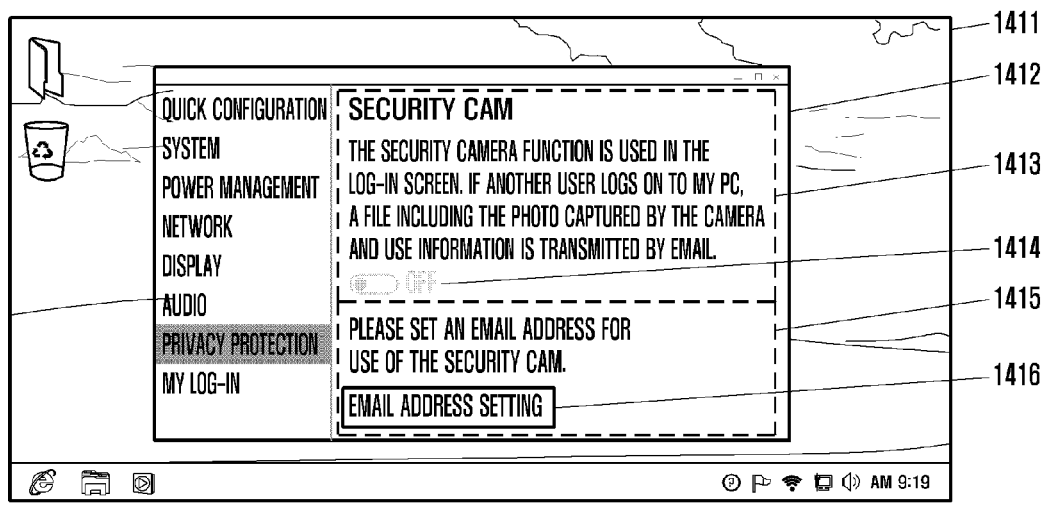
FIG. 14 is a diagram illustrating a monitoring operation configuration screen of an electronic device according to various embodiments of the present disclosure.

FIG. 14 is a diagram illustrating a monitoring operation configuration screen of an electronic device according to various embodiments of the present disclosure.

According to various embodiments, if a monitoring operation configuration mode is executed, the electronic device 201 may display a monitoring operation configuration popup window 1412 on the screen 1411.

According to various embodiments, the monitoring operation configuration popup window 1412 may include at least one of an on/off configuration section 1413 and a notification target address configuration section 1415.

According to various embodiments, the on/off setting section 1413 may include a graphic user interface configuration item 1414 for setting the security module 520 to on/off. The electronic device 201 may set the security module 520 to on/off according to the user input made with the graphic user interface configuration item 1414.

According to various embodiments, the notification target address configuration section 1415 may include an email address configuration interface item 1416. The email address configuration interface item 1416 may be a graphic user interface item with a text of "email address configuration". If the email address configuration interface item 1416 is selected, the electronic device 201 may display an email address configuration popup window.

Figure 15:
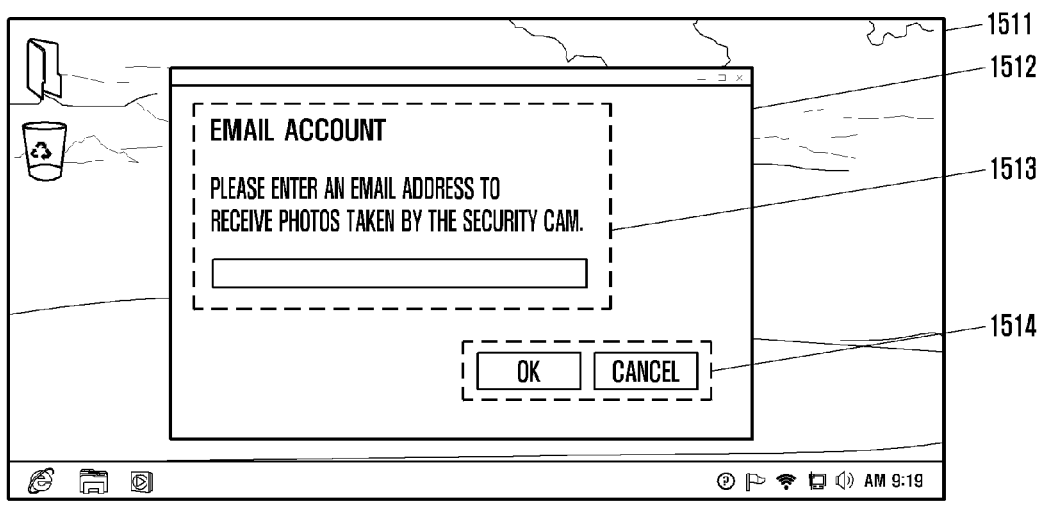
FIG. 15 is a diagram illustrating an email address configuration screen provided in a monitoring operation configuration process of the electronic device according to various embodiments of the present disclosure.

FIG. 15 is a diagram illustrating an email address configuration screen provided in a monitoring operation configuration process of the electronic device according to various embodiments of the present disclosure.

In FIGS. 14 and 15, the notification target address configuration section may include an email address configuration interface item 1416. The email address configuration interface item 1416 may be a graphic user interface item with a text of "email address configuration". If the email address configuration interface item 1416 is selected, the electronic device 201 may display an email address configuration popup window 1512 on the screen 1511. The email address configuration popup window 1512 may include a user interface item 1513 for receiving an email address to which the image captured by the camera module 291 is transmitted and a user interface item 1514 for confirming or canceling the input. For example, after an email address is entered through the user interface item 1513, the electronic device 201 may determine whether to confirm or cancel the input of the email address based on the user input made through the user interface item 1514.

Figure 16:
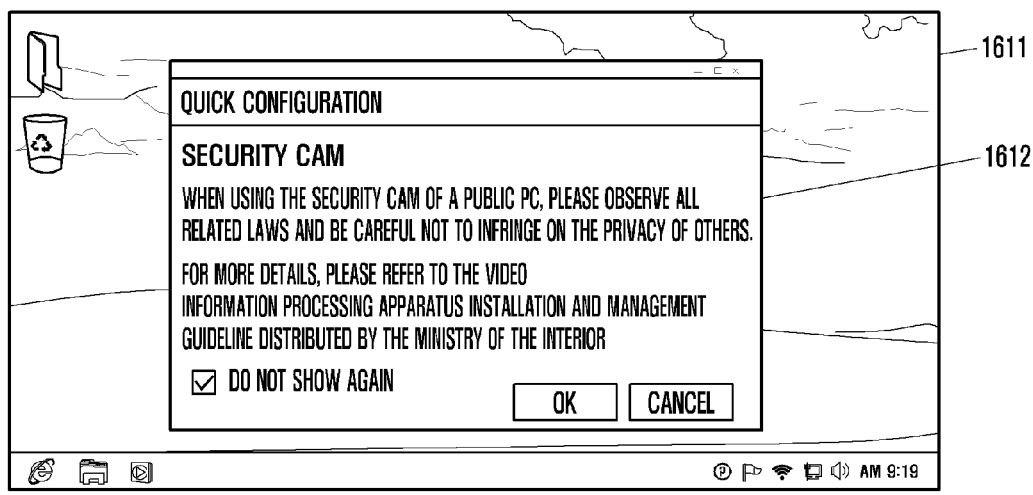
FIG. 16 is a diagram illustrating a monitoring operation configuration screen of an electronic device according to various embodiments of the present disclosure.

FIG. 16 is a diagram illustrating a monitoring operation configuration screen of an electronic device according to various embodiments of the present disclosure.

According to various embodiments, if the monitoring operation configuration is completed, the electronic device 201 may display a popup window 1612 notifying that the monitoring operation configuration has been completed. The popup window 1612 may also include privacy law and/or security camera installation information.

According to various embodiments, the electronic device 201 may display at least part of the screen 910, 1010, 1110, 1210, 1310, 1410, 1510, and 1610 in the form of one of a text, an image, an icon, a floating icon, and a widget or output a corresponding information in the form of a sound or vibration by means of an audio module (e.g., the audio module 280 of FIG. 2) or a motor (e.g., the motor 298 of FIG. 2) that is functionally connected to the electronic device 201. The electronic device 201 may change the objects or contents included in the screens 910, 1010, 1110, 1210, 1310, 1410, 1510, and 1610 visually, e.g., in shape, color, luminosity, transparency, position, and size.

Figure 17:
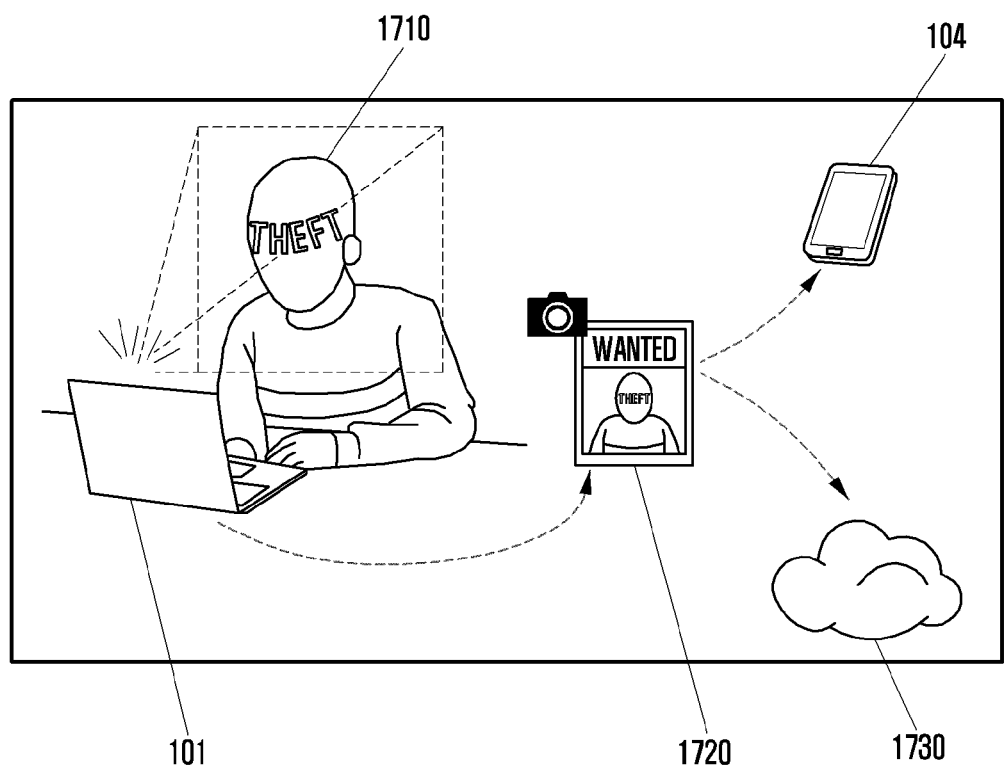
FIG. 17 is a diagram illustrating a screen display for explaining the monitoring operation of an electronic device according to various embodiments of the present disclosure.

FIG. 17 is a diagram illustrating a screen display for explaining the monitoring operation of an electronic device according to various embodiments of the present disclosure.

According to various embodiments, the electronic device 201 may take images of a user 1710 before and after log-on failure. If the log-on has failed, the electronic device 201 may transmit the acquired images, photos, or videos 1720 to an external electronic device (e.g., electronic device 104 and cloud device 1730).

As described above, the electronic device monitoring method and apparatus of the present disclosure is advantageous in terms of improving the security of the electronic device by warning the unauthorized user against illegal use and providing the authorized user with information on the illegal use attempts of the unauthorized user.

According to various embodiments of the present disclosure, the term "module", means, but is not limited to, a software, hardware, or firmware unit; and the term "module" may be interchangeably used with the terms "logic", "logical block", "component", or "circuit". The term "module" may indicate an integrated component or a smallest unit responsible for at least one function or a part thereof. A module may be implemented mechanically or electronically and may include at least one of an Application-Specific Integrated Circuit (ASIC) chip, a Field-Programmable Gate Array (FPGA), and a programmable logic device that is already known or to be developed.

The apparatuses (e.g., modules and functions thereof) or methods (e.g., operations) according to various embodiments of the present disclosure may be implemented in the form of computer-executable program commands stored in a computer-readable storage medium (e.g., memory 130). The commands may be executed by a processor (e.g., processor 120). The computer-readable storage medium may be the memory 130.

The computer-readable storage medium includes magnetic media such as a floppy disk and a magnetic tape, optical media including a Compact Disc (CD) ROM and a Digital Video Disc (DVD) ROM, magneto-optical media such as a floptical disk, and a hardware device designed for storing and executing program commands such as ROM, RAM, and flash memory. The program commands include a language code executable by computers using an interpreter as well as machine language codes created by a compiler. The aforementioned hardware device can be implemented with one or more software modules for executing the operations of the various embodiments of the present disclosure.

According to various embodiments of the present disclosure, the commands stored in the storage medium are executed by at least one processor to perform at least one operation, the at least one operation including receiving, at an electronic device 201, a lock screen display request, activating a camera module 291 connected functionally to the electronic device 201 in response to the request, capturing images including at least one object in association with the electronic device 201 using the camera module 291, receiving an input method through an input interface connected functionally to the electronic device, comparing the input with the authentication information, and transmitting, when the input does not match the authentication information, the captured image to an external electronic device.

The modules or programming modules according to various embodiments may include at least one of the aforementioned components with omission of some components or addition of other components. The operations of the modules, programming modules, or other components may be executed in series, in parallel, recursively, or heuristically. Also, some operations may be executed in different order, omitted, or extended with other operations.

Although the present disclosure has been described with various exemplary embodiments, various changes and modifications may be suggested to one skilled in the art. It is intended that the present disclosure encompass such changes and modifications as fall within the scope of the appended claims.

What is claimed is:

1. An electronic device comprising:
   a memory configured to store user authentication information;
   a camera module;
   an input interface; and
   a processor, wherein the processor is configured to:
   receive a request for displaying a lock screen,
   activate the camera module based on the request, acquire images including at least one object in association with the electronic device, receive an input made through the input interface, compare the input with the user authentication information, in response to the input not matching the user authentication information, transmit the acquired images to an external electronic device; and wherein the processor is further configured to delete the acquired images periodically in response to the input matching the user authentication information.

2. The electronic device of claim 1, wherein the processor is further configured to release the lock screen in response to the input matching the user authentication information.

3. The electronic device of claim 1, wherein the processor is further configured to delete the acquired images in response to the input matching the user authentication information.

4. The electronic device of claim 3, wherein the processor is further configured to check attributes of the acquired images and selectively delete the acquired images based on the attributes.

5. The electronic device of claim 1, wherein the processor is further configured to determine whether the acquired images include a predetermined object and in response to the acquired images including the predetermined object, store the acquired images including the predetermined object in the memory.

6. The electronic device of claim 1, wherein the processor is further configured to acquire the acquired images at a predetermined time interval.

7. The electronic device of claim 1, further comprising a display, wherein the processor is further configured to control the display to display the lock screen as part of activating the camera module.

8. The electronic device of claim 1, wherein the input interface comprises at least one of a keypad, a touch pad, an iris sensor, a fingerprint sensor, or a microphone, and wherein the user authentication information comprises at least one of a password, pattern information, iris information, fingerprint information, or voice information.

9. The electronic device of claim 1, wherein the processor is further configured to transmit the acquired images at a predetermined time before a time point when the processor detects the input matches the user authentication information as part of transmitting the acquired images.

10. A monitoring method of an electronic device, the method comprising:

receiving a request for displaying a lock screen;

activating a camera module which is functionally connected to the electronic device based on the request;

acquiring images including at least one object in association with the electronic device using the camera module;

receiving an input made through an input interface which is functionally connected to the electronic device;

comparing the input with authentication information; and in response to the input not matching the authentication information, transmitting the acquired images to an external electronic device; and wherein the electronic device is further configured to delete the acquired images periodically in response to the input matching the authentication information.

11. The method of claim 10, further comprising releasing the lock screen in response to the input matching the authentication information.

12. The method of claim 10, further comprising deleting the acquired images in response to the input matching the authentication information.

13. The method of claim 12, wherein deleting the acquired images comprises:

checking attributes of the acquired images; and selectively deleting the images based on the attributes.

14. The method of claim 10, further comprising:

determining whether the acquired images include a predetermined object; and in response to the acquired images including the predetermined object, storing the images including the predetermined object in a memory.

15. The method of claim 10, wherein acquiring the images comprises capturing the images at a predetermined time interval.

16. The method of claim 10, wherein activating the camera module comprises controlling a display to display the lock screen.

17. The method of claim 10, wherein the authentication information comprises at least one of a password input through a keypad, pattern information input through a touch pad, iris information input through an iris sensor, fingerprint information input through a fingerprint sensor, or voice information input through a microphone.

18. The method of claim 10, wherein transmitting the acquired images comprises transmitting the acquired images at a predetermined time before a time point when the input matches the authentication information.

19. A non-transitory storage medium comprising computer executable program code that when executed by at least one processor, causes the at least one processor to perform operations comprising:

receiving, at an electronic device, a request for displaying a lock screen;

activating a camera module which is functionally connected to the electronic device based on the request;

acquiring images including at least one object in association with the electronic device using the camera module;

receiving an input made through an input interface which is functionally connected to the electronic device;

comparing the input with authentication information;

in response to the input not matching the authentication information, transmitting the acquired images to an external electronic device; and wherein the at least one processor is further configured to delete the acquired images periodically in response to the input matching the authentication information.

* * * * *